United States Patent
Werner

(10) Patent No.: US 12,467,970 B2
(45) Date of Patent: Nov. 11, 2025

(54) TEST ARRANGEMENT FOR TESTING ONE OR MORE DEVICES, TEST SUPPORT MODULE FOR SUPPORTING TESTING ONE OR MORE DEVICES, AND METHOD FOR OPERATING AN AUTOMATED TEST EQUIPMENT

(71) Applicant: Advantest Corporation, Tokyo (JP)

(72) Inventor: Matthias Werner, Bibertal (DE)

(73) Assignee: ADVANTEST CORPORATION, Tokyo (JP)

( * ) Notice: Subject to any disclaimer, the term of this patent is extended or adjusted under 35 U.S.C. 154(b) by 365 days.

(21) Appl. No.: 18/162,699

(22) Filed: Jan. 31, 2023

(65) Prior Publication Data

US 2023/0184824 A1    Jun. 15, 2023

Related U.S. Application Data

(63) Continuation of application No. PCT/EP2020/083806, filed on Nov. 27, 2020.

(51) Int. Cl.
*G01R 31/28*   (2006.01)
*G01R 1/02*    (2006.01)
(Continued)

(52) U.S. Cl.
CPC ..... *G01R 31/2834* (2013.01); *G01R 1/07342* (2013.01)

(58) Field of Classification Search
CPC ........ G01R 31/00; G01R 31/02; G01R 31/27; G01R 31/28; G01R 1/02; G01R 1/04;
(Continued)

(56) References Cited

U.S. PATENT DOCUMENTS 6,794,887 B1   9/2004 Nelson et al.
9,733,301 B2   8/2017 Roberts
(Continued)

FOREIGN PATENT DOCUMENTS

JP   2007183164   7/2007
JP   2009085720   4/2009
(Continued)

OTHER PUBLICATIONS

First Office Action received for Chinese Application No. 202080101827.5 dated Dec. 26, 2024, 24 pages.
(Continued)

*Primary Examiner* — Neel D Shah
(74) *Attorney, Agent, or Firm* — Squire Patton Boggs LLP; Sarah Mirza

(57) ABSTRACT

The disclosure describes a test support module for supporting a test of at least one device under test (DUT). The test support module comprises a plurality of pogo pins configured to establish a connection to at least one of a load board or a probe card of an automated test equipment and at least one electronic support component configured to support a test of at least one DUT. The at least one electronic support component is electrically coupled to the pogo pins. The test support module is configured to be inserted into a pogo block frame of the automated test equipment to position the pogo pins in an alignment position to contact at least one of the load board or the probe card. The testing innovation is more efficient in view of customization, life duration of the components, high signal performance, tester channel resources, re-usability, and costs.

27 Claims, 28 Drawing Sheets

(51) Int. Cl.
*G01R 1/04* (2006.01)
*G01R 1/067* (2006.01)
*G01R 1/073* (2006.01)
*G01R 31/27* (2006.01)

(58) Field of Classification Search
CPC .......... G01R 1/067; G01R 1/073; G01R 1/20; H01R 13/24; H01R 13/631; H01L 21/67
See application file for complete search history.

(56) References Cited

U.S. PATENT DOCUMENTS

| | | |
|---|---|---|
| 2003/0052319 A1 | 3/2003 | Chen et al. |
| 2007/0024305 A1* | 2/2007 | Kim ................ G01R 1/06794 |
| | | 324/750.01 |
| 2011/0193584 A1* | 8/2011 | Roberts .............. G01R 31/2834 |
| | | 324/756.05 |
| 2014/0145741 A1* | 5/2014 | Nakata ................ G01R 31/2889 |
| | | 324/754.07 |
| 2020/0116756 A1* | 4/2020 | Mochizuki ........... G01R 1/0416 |

FOREIGN PATENT DOCUMENTS

| | | |
|---|---|---|
| JP | 2014044597 | 3/2014 |
| JP | 2020-064914 A | 4/2020 |
| KR | 10-2012-0028850 A | 3/2012 |
| KR | 10-2012-0127241 A | 11/2012 |
| TW | 201512678 | 4/2015 |

OTHER PUBLICATIONS

Office Action received for Korean Application No. 10-2023-7000776 dated Jan. 24, 2024, 10 pages.

* cited by examiner

| | 01 | 02 | 03 | 04 | 05 | 06 | 07 | 08 | 09 | 10 | 11 | 12 | 13 | 14 | 15 | 16 | 17 |
|---|---|---|---|---|---|---|---|---|---|---|---|---|---|---|---|---|---|
| PCB1, a | GND1 EN1 | VSS | S4 | S3 | S2 | S1 | D | S4 | S3 | S2 | S1 | D | S4 | S3 | S2 | S1 | D |
| PCB1, b | VDD | A0 | S4 | S3 | S2 | S1 | D | S4 | S3 | S2 | S1 | D | S4 | S3 | S2 | S1 | D |
| PCB2, c | A1 | GND2 | S4 | S3 | S2 | S1 | D | S4 | S3 | S2 | S1 | D | S4 | S3 | S2 | S1 | D |
| PCB2, d | EN2 | | S4 | S3 | S2 | S1 | D | S4 | S3 | S2 | S1 | D | S4 | S3 | S2 | S1 | D |

Fig. 9B

TEST ARRANGEMENT FOR TESTING ONE OR MORE DEVICES, TEST SUPPORT MODULE FOR SUPPORTING TESTING ONE OR MORE DEVICES, AND METHOD FOR OPERATING AN AUTOMATED TEST EQUIPMENT

CROSS-REFERENCE TO RELATED APPLICATION

This application is a continuation of copending International Application No. PCT/EP2020/083806, filed Nov. 27, 2020, which is incorporated herein by reference in its entirety.

TECHNICAL FIELD

Embodiments according to the present application are concerned with testing one or more devices under test in an automated test equipment, and particularly with supporting such testing.

Embodiments according to the disclosure are related to a test support module for supporting a test of one or more devices under test in an automated test equipment.

Further embodiments according to the disclosure are related to a test arrangement for testing one or more devices under test.

Further embodiments according to the disclosure are related to a method for operating an automated test equipment.

According to an aspect, embodiments according to the disclosure can be applied to provide a highly customizable, flexible and cost-effective concept of device testing using pogo blocks.

BACKGROUND

A multitude of testing arrangements, particularly testing arrangements using pogo blocks, is currently known.

In the known testing systems and apparatuses, the load boards comprise a plurality of support electronic components, including those providing communication between the load board and pin electronic cards, which are usually used. For example, one of known solutions is shown in FIG. 1. Specifically, FIG. 1 shows a schematic view of routing a signal from a pin electronic card into a load board and back from the load board to the pin electronic card as conventionally performed upon using pin electronic cards. A conventional or normal pin electronic card 100 consists of a pin electronic board 101, a coax cable 102 and a pogo block 103. The signals are routed from the pin electronic board 101 to the pogo block 103 via the coax cable 102 and from the pogo block 103 to the load board.

Custom or application specific solutions need to be put on load boards. Therefore, they are exposed to the environment (hot, cold test) as well as need to be duplicated for each load board as they cannot be re-used. Therefore, these custom solutions have the following disadvantages.

First of all, the known solutions highly rely on a particular load board and cannot be easily used with any random load board, for example from another manufacturer. A high dependence on application and load boards requires creating new circuits for each application, which is not very cost-effective.

Since in the known solutions, the electronic components used to support device testing are mostly arranged in a load board of the testing equipment, a load board space is limited.

This also provides an additional risk of destruction of the electronic components due to temperature influence, since the load board may heat up or may be cooled down to the temperatures between minus 50-170° C., whereas most load board components are specified at 85° C.

The known concepts may also have the problems of a poor signal performance due to long signal paths and limited tester channel resources.

In view of the above, there is a desire to create a test support concept, which provides an improved tradeoff between performance, flexibility, reliability and cost of test. Accordingly, there is a desire to provide a concept, which is more efficient in view of improving a tradeoff between performance, flexibility, reliability and cost of test.

SUMMARY

An embodiment according to the disclosure creates a test support module for supporting a test of one or more devices under test in an automated test equipment. The test support module comprises a plurality of pogo pins, e.g., spring loaded pins, adapted to establish a connection to a load board or to a probe card, which is adapted for example to contact one or more devices under test; and one or more electric or electronic support components, e.g., one or more switches, like RF mechanical relays, MEMS relays, amplifiers, multiplexers, signal converters, and the like, which are configured to support the test of the one or more devices under test. The one or more support components are electrically coupled with the pogo pins; and the test support module is, e.g., mechanically, adapted to be inserted into one or more pogo block positions, or one or more pogo block locations, of a pogo block frame, such that the pogo pins are aligned to contact the load board.

This embodiment is based on the finding that electronic support components could be arranged on a separate printed circuit board which could be combined with pogo blocks to create a universal test support module, and which can be mounted in a pogo block position, or a pogo block location, of a pogo block frame and which can be coupled to a load board or to a probe card via the pogo pins. Thus, available space in otherwise unused pogo block positions of an interface between a test head of an automated test equipment and a load board can be used for electric or electronic support components which support a test. This test support module can be easily replaced and used with different load boards and/or probe cards irrespectively of the manufacturer. This concept provides a low cost, low complexity, high flexibility and field customization. Since the electronic component are placed in the test support module and not in the load board, the valuable load board components space is saved and the components are protected from high temperatures due to their arrangement out of the load board.

According to an embodiment, the test support module is electrically coupled to its environment via the plurality of pogo pins, and the test support module does not comprise any cables for a connection with a channel module of the automated test equipment. Due to removing (or omitting) cables, electrical components are placed (or at least can be placed) very close to pogo pins, which allows maintaining a signal performance at a high level due to avoiding routing signals forth and back from tester pogo to applications space in the load board center. Also, by avoiding a cable connection to the channel module of the automated test equipment, an exchange of the test support module is very easy.

According to an embodiment, the test support module is configured to avoid a direct coupling with a channel module of the automated test equipment, e.g., via a direct cable, while coupled to the load board. This increases a signal quality.

According to an embodiment, the test support module comprises electrical connections, e.g., implemented using pogo pins, on a load board side, e.g., on a side on which the pogo pins for contacting the load board are arranged, or on a probe card side e.g., on a side on which the pogo pins for contacting the probe card are arranged. A mechanically simple solution is thus provided, and an exchange of the test support module is easily possible (e.g., without any effort to loosen cable connections).

According to an embodiment, the test support module is configured to couple a single automated test equipment channel, e.g., of a pin electronics card, with a plurality of device under test pins (for example such that a number of ATE channels or a number of pin electronics cards can be reduced when compared to a test equipment which does not comprise a test support module). This leads to expanding (effective) tester resources. In other words, a number of actual channel modules may be reduced by using the test support module, which helps to reduce test costs.

According to an embodiment, the one or more electric or electronic support components are adapted to be in a signal path between an automated test equipment channel and one or more devices under test. Significant saving of tester channel resources is thus provided, which also leads to a decreased cost. Signals of the signal path can be handles as desired, e.g., distributed, switched, amplified, attenuated, and so on.

According to an embodiment, one or more signal path inputs and one or more corresponding signal path outputs of the test support module are coupled to the pogo pins, e.g., to pogo pins which are arranged to contact the load board. A direct and short signal path is provided, which increases a signal quality.

According to an embodiment, the test support module is configured to receive one or more control signals, which control a functionality of one or more of the electric or electronic support components, via one or more of the pogo pins, e.g., via pogo pins arranged to contact the load board. The electronic support components could be controlled by the testing arrangement, which provides a support test module which could be used with any load board and any testing arrangement. In other words, by using such a configuration, the control signals may efficiently be routed to the test support module via the load board, which avoids the need for any additional wiring.

According to an embodiment, the test support module comprises a switch, e.g., an RF mechanical relay or a MEMS relay. The switch is in a signal path between a signal path input of the test support module and a signal path output of the test support module. The signal path input and the signal path output may be, for example, coupled to respective ones of the pogo pins. The switch may, for example, selectably connect a switch input, which is coupled to a pogo pin of the test support module, with one or more switch outputs, which are coupled to pogo pins of the test support module, e.g., in order to perform a multiplexing functionality, or the switch may be, for example, be configured to selectably connect one of a plurality of switch inputs, which are coupled to pogo pins of the test support module, to a switch output, which is coupled to a pogo pin of the test supply module, e.g., in order to perform a multiplexing functionality. A protection of a switch from high temperatures is provided. Also, a high bandwidth and signal integrity may be maintained due to the short signal path in the test module, i.e., an increased signal performance is provided. At the same time, a space for high multi-site sockets (or for a large number of device under test sockets) is provided in the load board space, since no load board space is required for providing a switch functionality. An easy customizable, upgradable and expandable solution to provide a switch functionality, which is independent of load board and applications, is provided.

According to an embodiment, the test support module comprises a multiplexer, e.g., a multiplexer integrated circuit or a DC multiplexer circuit. The multiplexer is in a signal path between a signal path input of the test support module and a signal path output of the test support module. The signal path input and the signal path output may be, for example, coupled to respective ones of the pogo pins. The multiplexer may, for example, selectably connect a multiplexer input, which is coupled to a pogo pin of the test support module, with one or more multiplexer outputs, which are coupled to pogo pins of the test support module, e.g., in order to perform a multiplexing functionality, or the multiplexer may be, for example, be configured to selectably connect one of a plurality of multiplexer inputs, which are coupled to pogo pins of the test support module, to a multiplexer output, which is coupled to a pogo pin of the test supply module, e.g., in order to perform a multiplexing functionality. An easy customizable, upgradable and expandable solution to provide a multiplexing functionality, which is independent of load board and applications, is provided. This also saves a load board space and ATE channel resources.

According to an embodiment, the test support module comprises a signal distributor, e.g., a (e.g., passive) power splitter or an active power distribution device. The signal distributor is in a signal path between a signal path input of the test support module and a plurality of signal path outputs of the test support module (the signal path input and the signal path output may be, for example, coupled to respective ones of the pogo pins), and is adapted to simultaneously distribute a signal received from the signal path input of the test support module to a plurality of signal path outputs of the test support module. An easy customizable, upgradable and expandable solution to provide a signal distribution, which is independent of load board and applications, is provided. This also saves a load board space and ATE channel resources.

According to an embodiment, the test support module comprises a signal conditioner, e.g., an amplifier and/or an attenuator and/or a filter and/or a level converter and/or a nonlinear distorter and/or an isolation device like a circulator or a transformer, and/or a limiter, and/or e.g., a power distributor, e.g., a voltage source, e.g., a current source, e.g., a DCDC, e.g., an ACDC, e.g., a level converter (e.g., 4→40V). The signal conditioner is in a signal path between a signal path input of the test support module and a signal path output of the test support module (wherein the signal path input and the signal path output may be, for example, be coupled to respective ones of the pogo pins), and adapted to manipulate a signal received from the signal path input of the test support module. An easy customizable, upgradable and expandable solution to provide a signal conditioner, which is independent of load board and applications, is provided. This also saves a load board space and protects components, e.g., amplifiers, attenuators etc. from high temperatures.

According to an embodiment, the test support module comprises a protocol converter, e.g., an USB to RGMII converter. The signal protocol converter is in a signal path between a first signal path port of the test support module and a second signal path port of the test support module (the first signal path port and the second signal path port may be, for example, coupled to respective ones of the pogo pins), and is adapted to perform a protocol conversion. This provides an adapter to expand capability and adjust to application, whereas reducing complex LBA wiring and maintaining high signal performance. An easy customizable, upgradable and expandable solution to provide an adapter, which is independent of load board and applications, is provided. This also saves a load board space and protects components from high temperatures.

According to an embodiment, the test support module is, e.g., mechanically, adapted to be inserted into a plurality of pogo block positions, or pogo block locations, of a pogo block frame, such that the pogo pins are aligned to contact the load board. This provides a simple re-usable solution. Moreover, since a single test support module may occupy a plurality of adjacent pogo block positions, a complex functionality may be implemented on the test support module, and a length (or depth) of the test support module may be kept small (which helps to avoid mechanical conflicts).

According to an embodiment, the test support module comprises one or more printed circuit boards which are parallel to axes (or e.g., not parallel, or e.g., not tangential) of the pogo pins (wherein, for example, one or more of the pogo pins are attached tangentially to the one or more printed circuit boards), wherein the one or more electric or electronic support components are arranged on the one or more printed circuit boards. An amount of support electrical components to be removed (or relocated) from the load board is thus increased, further providing more free space on the load board for high multi-site sockets. Also, it can be achieved that the printed circuit board of the test support module is substantially perpendicular to the load board, which may significantly increase the available area for the support components. Also, the pogo pins may be reliably attached to the printed circuit board using such a configuration. For example, the one or more printed circuit boards could also be perpendicular to the axes of the pogo pins in an alternative implementation.

According to an embodiment, the test support module comprises a housing, or e.g., a case. The housing comprises, on a side adapted to face the load board or the probe card, a plurality of holes through which the pogo pins extend, and a mounting structure, or e.g., an attachment structure, for mounting the test support module in a pogo block position, or a pogo block location, of a pogo block frame, e.g., two or more holes or threaded holes. The one or more electric or electronic test support components are arranged on a printed circuit board which is placed within the case. The pogo pins may, for example, be soldered or electrically connected to this printed circuit board. A simple, low cost solution to provide a re-usable, easily replaceable support component is provided.

An embodiment according to a disclosure creates a test arrangement for testing one or more devices under test. The test arrangement comprises a pogo block frame comprising a plurality of pogo block positions, or pogo block locations, wherein one or more pogo blocks (e.g., units to interface pogo pins or pogo needles to cables, e.g., using a printed circuit board, comprising pogo pins and cables, e.g., coaxial cables, for establishing a connection with one or more channel modules, e.g., pin electronics cards) of the test arrangement are arranged in one or more of the pogo block positions. One or more test support modules according to any of the above described embodiments are arranged in one or more of the pogo block positions. The pogo pins of the one or more pogo blocks and the pogo pins of the one or more test support modules are arranged to contact a load board, e.g., when the load board is attached to the test arrangement.

This embodiment is based on the finding that electronic support components could be arranged on a separate printed circuit board which could be combined with pogo blocks to create a universal test support module. This test support module can be easily replaced and used with different load boards irrespective of the manufacturer. This concept provides a low cost, low complexity, high flexibility and field customization. Since the electric or electronic support components are placed in the test support module and not in the load board, the valuable load board components space is saved and the components are protected from high temperatures due to their arrangement out of the load board.

According to an embodiment, the test arrangement further comprises a load board. The pogo pins of the one or more pogo blocks contact the load board, and the pogo pins of the one or more test support modules contact the load board. A direct and short signal path is provided, which increases a signal quality.

According to an embodiment, the test arrangement comprises a signal path, e.g., a signal path between an automated test equipment channel and one or more devices under test, which extends from the load board to one of the test support modules and back to the load board. A high signal performance is provided due to short and direct signal path.

According to an embodiment, the test arrangement comprises a signal path, e.g., a signal path from a channel module of the automated test equipment to a device under test, and/or a signal path from a device under test to a channel module of the automated test equipment, which extends via the test support module, and e.g., consequently via pogo pins connecting the support module with the load board. Accordingly, a high signal performance is provided, for example, because the test support module is closely linked to the load board.

According to an embodiment, a signal path of the test arrangement extends from a channel module, e.g., of the automated test equipment, to a given one of the pogo blocks via a cable, from the given one of the pogo blocks to a first pogo pad of the load board via a pogo pin of the given one of the pogo blocks, from the first pogo pad of the load board to a second pogo pad of the load board, e.g., via a conductor path on the load board, from the second pogo pad of the load board to an input of a given one of the test support modules via a pogo pin of the test support module, from an output of the given one of the test support modules to a third pogo pad of the load board via another pogo pin of the test support module, and from the third pogo pad of the load board to a device under test (e.g., either directly via a conductor path on the load board, or via one or more additional components); and/or wherein a signal path of the test arrangement, e.g., another signal path, different from the one mentioned before, extends from a device under test to a fourth pogo pad of the load board, from the fourth pogo pad of the load board to an input of the test support module, e.g., via a pogo pin of the support module, from an output of the test support module to a fifth pogo pad of the load board, e.g., via another pogo pin of the test support module, from the fifth pogo pad of the load board to a sixth pogo pad of the load board, e.g., via a conductor path on the load board, from the sixth pogo pad on the load board to a given one of the pogo blocks, e.g., another pogo block, different from the one mentioned before, via a pogo pin of the given one of the pogo blocks, e.g., the another pogo block, and from the given one of the pogo blocks, e.g., the another pogo block, to a channel module of the automated test equipment via a cable, e.g., another cable, different from the one mentioned before. A channel module can be digital or analog in embodiments. A channel module can be, e.g., a power supply, e.g., a digital channel, e.g., an analog channel, e.g., a power channel, e.g., an RF channel, e.g., a native tester source, e.g., a tester measurement resource, e.g., an ADV power supply, etc. Accordingly, a high signal performance is provided. Moreover, the support module provides an additional functionality while avoiding long extra signal routes.

According to an embodiment, the pogo block positions, or the pogo block locations, are arranged in a peripheral area of the pogo block frame, e.g., arranged in one or more rows along one or more edges of the pogo block frame. The temperature influence on the test support module from the components of the load board is thus decreased. The electronic components of the test support module are further protected from high temperatures.

According to an embodiment, the pogo block frame comprises at least one row of exemptions, e.g., of rectangular openings, wherein the exemptions are adapted for an installation of a plurality of pogo blocks and test support modules at pogo block positions, or pogo block locations, of the pogo block frame. An easy and mechanically simple replacing functionality of the test support modules is thus provided.

According to embodiments, the pogo block frame could have, e.g., a rectangular form, or e.g., a round form, or e.g., a circular form. For example, the pogo block frame could be a wafer sort pogo tower or a part of a wafer sort pogo tower.

According to an embodiment, the pogo block frame, the pogo blocks and the test support modules are adapted such that pogo blocks and test support modules are interchangeably mountable in the pogo block positions, or locations. An easy and mechanically simple replacing functionality of the test support modules is thus provided. A re-usable plug and play solution independent of applications is provided.

According to an embodiment, the load board comprises one or more device-under test sockets, e.g., test sockets, like zero-insertion-force test sockets, or the like, or e.g., a probe card head or "pogo tower," for example in wafer test, in a central area of the load board, e.g., on a first side of the load board. The load board comprises a plurality of blocks of pogo pads in a peripheral area of the load board, e.g., on a second side of the load board which is opposite to the first side of the load board (wherein e.g., a central area of the load board is free from pogo pads. The temperature influence on the test support module from the device-under test sockets of the load board is thus decreased. The electronic components of the test support module is further protected from high temperatures. The testing quality is also increased due to decreasing an influence of high temperature or environmental conditions.

According to an embodiment, the one or more test support modules, or e.g., even all test support modules, and e.g., also the pogo bocks, or e.g., even all pogo blocks, are arranged to contact, e.g., using their pogo pins, pogo pads of the load board which are in a peripheral area of the load board. A signal performance is provided due to short and direct signal path. Also, the connection between the test support module and the load board can be established in a toolless manner.

According to an embodiment, the one or more test support modules are arranged to contact the load board, e.g., pogo pads of the load board, from a first side, which is opposite to a second side of the load board on which one or more device under test sockets are arranged. A signal performance is provided due to short and direct signal path. Also, separate thermal domains can be established on the different sides of the load board.

According to an embodiment, the test arrangement is mounted on a test head of an automated test equipment. Thus, the support modules may, for example, be within the test head, and may therefore be well protected.

According to an embodiment, the test arrangement is configured to selectably, e.g., switchably, couple a given channel of the automated test equipment to a plurality of device under test pins, e.g., of a single device under test, or even of different devices under test, or e.g., to a support equipment, e.g., a handler. A switch or multiplexer for selecting to which device under test pin the given channel of the automated test equipment is coupled, is arranged on one of the one or more the test support modules (wherein, for example, the given channel is coupled to the load board via a cable and one of the one or more pogo blocks; wherein, for example, the given channel is coupled to the test support module via a cable, a pogo pin of one of the one or more pogo blocks, a conductive trace on the load board, and a pogo pin of the test support module). The test arrangement is configured to process a signal provided by a device under test in the test support module, to obtain a processed signal, and to forward the processed signal to a given channel of the automated test equipment or to a support equipment, e.g., a handler. In the amplifier example, the signal is sent from the device to the test support module to a handler equipment. Not necessarily the signal is always sent to a tester channel. A protection of a switch from high temperatures can be achieved. Also, high bandwidth and signal integrity may be maintained due to the short signal path in the test module, i.e., an increased signal performance is provided. At the same time, a space for high multi-site sockets is provided in the load board space, since no load board space is required for providing a switch functionality. An easy customizable, upgradable and expandable solution to provide a switch functionality, which is independent of load board and applications, is provided.

According to an embodiment, the test arrangement is configured to distribute a signal provided by a given channel of the automated test equipment to a plurality of device under test pins, e.g., of a single device under test, or even of different devices under test. A distribution circuit for distribution the signal provided by the given channel of the automated test equipment is arranged on one of the one or more the test support modules. An easy customizable, upgradable and expandable solution to provide a signal distribution, which is independent of load board and applications, is provided. This also saves a load board space and ATE channel resources.

An embodiment according to the disclosure creates a test arrangement for testing one or more devices under test. The test arrangement comprises a pogo block frame, e.g., a pogo tower, e.g., a wafer sort pogo tower, for establishing a connection between a load board and a probe card, comprising a plurality of pogo block positions, e.g., sectors of a circular ring. One or more through-connection pogo blocks for establishing a connection between opposite surfaces of the pogo block frame are arranged in one or more of the pogo block positions. One or more test support modules according to any of the above described embodiments are arranged in one or more of the pogo block positions. Pogo pins at a first side of the one or more through-connection pogo blocks are arranged to contact a load board, and pogo pins at a second side of the one or more through-connection pogo blocks are arranged to contact a probe card. Pogo pins of the one or more test support modules are arranged to contact the load board or are arranged to contact the probe card. For example, the test support module may be configured to have pogo pins either on the load board side or on the probe card side (but not on both sides).

This embodiment is based on the finding that electronic support components could be arranged on a separate printed circuit board which could be combined with pogo blocks to create a universal test support module. This test support module can be easily replaced and used with different load boards and/or probe cards irrespective of the manufacturer. This concept provides a low cost, low complexity, high flexibility and field customization.

According to an embodiment, the test arrangement further comprises a load board, wherein the pogo pins at the first side of the one or more through-connection pogo blocks contact the load board, and wherein the pogo pins of the one or more test support modules contact the load board. A direct and short signal path is provided, which increases a signal quality.

According to an embodiment, the test arrangement further comprises a probe card, wherein the pogo pins at the second side of the one or more through-connection pogo blocks contact the probe card, and wherein the pogo pins of the one or more test support modules contact the probe card. A direct and short signal path is provided, which increases a signal quality.

According to an embodiment, the test arrangement comprises a signal path, which extends from the load board to one of the test support modules and back to the load board, and/or a signal path, which extends from the probe card to one of the test support modules and back to the probe card, and/or a signal path, which extends from the load board to one of the test support modules and from the one of the test support modules to the probe card, and/or a signal path, which extends from the probe card to one of the test support modules and from the one of the test support modules to the load board. Theoretically, the signal can go from e.g., the load board to the pogo block to the test support module and from there to the other side of the pogo block to the probe card. The signal does not necessarily need to come from the load board and need to go back to the load board. The same is applied for probe card. A high signal performance is provided due to short and direct signal path. Also, additional signal distribution functionality or signal conditioning functionality or power management functionality can be provided on the test support module in a space-efficient manner.

According to an embodiment, the test arrangement comprises a signal path which extends via the test support module. Accordingly, a high signal performance is provided, for example, because the test support module is closely linked to the load board and/or the probe card.

According to an embodiment, the pogo block positions are arranged in a peripheral area of the first side and/or in a peripheral are of the second side of the pogo block frame.

According to an embodiment, the pogo block frame has a cylindrical form and/or comprises, for example, but not necessarily, a cylindrical through cutout in a central part. In an embodiment, the load board and/or the probe have, for example, but not necessarily a cylindrical through cutout in their central part, correspondingly, to fit the cutout of the pogo block frame.

An embodiment according to the disclosure creates a method for operating an automated test equipment. The method comprises routing a signal to be provided to a device under test as a test stimulus signal, e.g., generated by a channel module of the automated test equipment, or a signal provided by a device under test, e.g., to be evaluated by a channel module of the automated test equipment, via a test support module according to any of the above described embodiments.

An embodiment according to the disclosure is directed to a computer-readable storage device storing a computer program having a program code for performing the methods according to any of the embodiments described above. Also, the computer-readable storage device includes a plurality of computer-executable instructions stored therein for performing the methods of testing the component.

These and further advantageous aspects are the subject of the dependent claims.

The test support module, the test arrangement and the method described above may optionally be supplemented by any of the features, functionalities, and details disclosed herein, both individually and taken in combination.

This summary is provided to introduce a selection of principles of the disclosure in a simplified form that are further described below in the Detailed Description section. This summary is not intended to identify key features or essential features of the claimed subject matter, nor is it intended to be used to limit the scope of the claimed subject matter.

BRIEF DESCRIPTION OF THE DRAWINGS

The accompanying drawings, which are incorporated in and form a part of this specification, illustrate embodiments, together with the description, serve to explain the principles of the disclosure.

Embodiments of the present disclosure are set out below in the figures.

FIG. 9B shows a table illustrating a pin assignment of a test support module in accordance with an embodiment.

DETAILED DESCRIPTION

Reference will now be made in detail to embodiments, examples of which are illustrated in the accompanying drawings. While the disclosure will be described in conjunction with these embodiments, it should be understood that they are not intended to limit the disclosure to these embodiments. On the contrary, the disclosure is intended to cover alternatives, modifications, and equivalents, which may be included within the spirit and scope of the disclosure as defined by the appended claims. Furthermore, in the following detailed description, numerous specific details are set forth in order to provide a thorough understanding. However, it will be recognized by one of ordinary skill in the art that embodiments may be practiced without these specific details.

Figure 1:
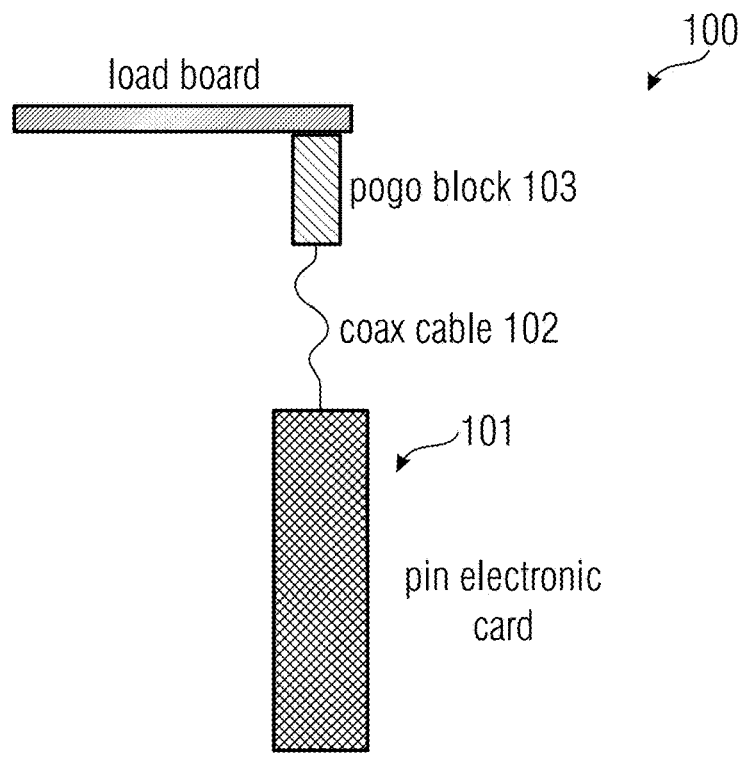
FIG. 1 shows a schematic view of signal routing between a pin electronic card and a load board according to a conventional apparatus.
Figure 2:
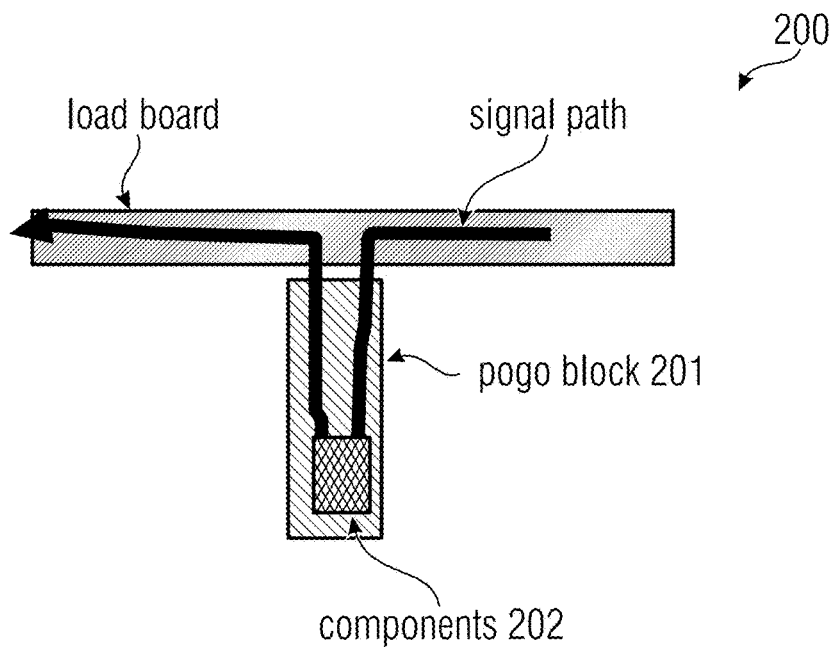
FIG. 2 shows a schematic view of a test support module in accordance with an embodiment.

FIG. 2 shows a schematic view of how a signal can be routed using a test support module 200 in accordance with an embodiment.

The signal is routed from the load board into a pogo block 201 of the test support module, where support components (e.g., standardized test support components or custom, e.g., applications specific, support components) 202 are placed, Thus, the signal is routed from the load board via a pogo pin of the pogo block 201 towards an input of a support component. From there, e.g., from an output of a support component or of the support component, the signal is routed back to the load board, e.g., via another pin of the pogo block 201.

For example, no direct interaction, or no direct connection, which is not routed via the load board, between the test support module and the test system electronics or any cables is present in this embodiment.

However, it should be noted that the test support module 200 may optionally be supplemented by any of the features, functionalities and details disclosed herein, both individually or taken in combination.

Figure 3A:
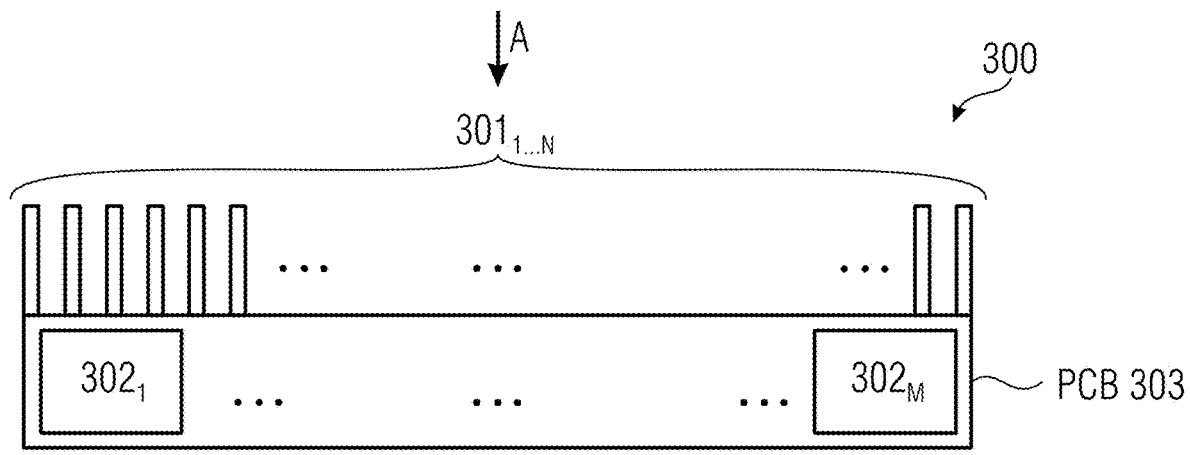
FIG. 3A shows a schematic top view of a test support module in accordance with an embodiment.
Figure 3B:
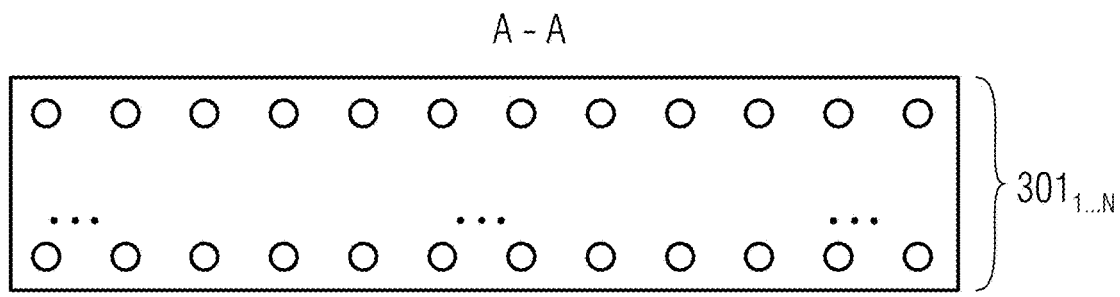
FIG. 3B shows a schematic front view of a test support module in accordance with an embodiment.

FIGS. 3A and 3B show a schematic view of a test support module 300 in accordance with an embodiment.

FIG. 3A shows a top view of the test support module 300.

The test support module comprises N pogo pins $301_{1...N}$ and M electronic support components $302_{1...M}$, which are configured to support testing of one or more devices under test in an automated test equipment.

For example, the pogo pins $301_{1...N}$ are attached (e.g., soldered) to a Printed circuit board (PCB) 303.

The electronic support components $302_{1...M}$ (e.g., one or more relays or one or more multiplexers, or one or more amplifiers) are, for example, arranged on or in the PCB (e.g., soldered onto the PCB or, for example, embedded in a PCB) and electrically coupled with the pogo pins $301_{1...N}$ (e.g., via conductive traces of the PCB). One of the one or more electronic support components, for example electronic support component $302_1$ may be electrically coupled with one or more of pogo pins $301_{1...N}$, of one or more pogo blocks, as it is shown, for example, in FIG. 2. Pogo blocks are simple units (e.g., blocks of pogo pins) to interface pogo needles to cables using a PCB.

FIG. 3B shows a front view of the test support module 300 (e.g., a view onto a side of the support module which is intended to face a load board). Tips of the pogo pins (some or all of which are coupled to signal path inputs and/or signal path outputs and/or control connections and/or supply connections of the one or more support components) can be seen in the front view of FIG. 3B. The pogo pins are, for example, arranged in a pattern which fits corresponding pads on the load board. As an example, the pogo pins may be arranged on regular grid in the top view of FIG. 3A (wherein some grid positions may be free from pogo pins). In other words, there may, for example, be a plurality of substantially parallel rows of pogo pins. However, in some embodiments, there may be one row of pogo pins.

Moreover, it should be noted that the test support module is (mechanically) adapted to be inserted into one or more pogo block positions of a pogo block frame. For example, an outer shape of the support module may be chosen to fit into one or more pogo block locations. Also, the support module may comprise appropriate fastening means to fasten the support module in one or more pogo block locations. As an example, the support module may comprise holes or threaded holes (not shown) on its front side (e.g., the side shown in FIG. 3A) to fasten the support module in one or more pogo block locations (e.g., using a plurality of screws). Alternatively or in addition, the support module may comprise one or more snap-in components to snap-fix the support module in one or more pogo block locations.

The support module may be adapted to receive one or more input "test signals" (e.g., signals which are received from a signal generator, e.g., a pin electronics module, of an automated test equipment and should be forwarded to a device under test (DUT), and/or signals provided by a DUT which should be forwarded to a measurement unit, e.g., a pin electronics module or any other signal analyzer) from the load board via one or more of its pogo pins and may be adapted to output one or more output "test signals" (e.g., signals to be forwarded to the DUT, or signals to be forwarded to a measurement unit of the automated test equipment) to the load board via one or more of its pogo pins. In addition, the support module may be adapted to receive one or more control signals which determine a functionality (e.g., a switch state) of the one or more support components, and also one or more supply signals (like a supply voltage and a reference voltage).

The test support module may, generally speaking, impact the test signals passing through the support module, for example, by switching between different test signal paths or by providing an amplification or attenuation. Thus, the test support module may support a test of a DUT, for example by providing a switching functionality or a multiplexing functionality, or a signal conditioning functionality.

However, it should be noted that the test support module 300 may optionally be supplemented by any of the features, functionalities and details disclosed herein, both individually or taken in combination.

Figure 3C:
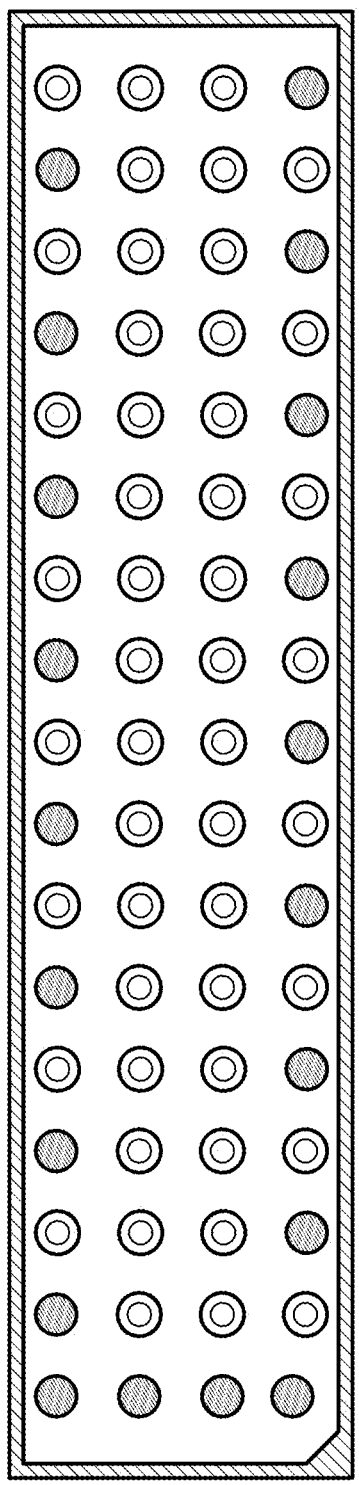
FIG. 3C shows a front view of a test support module in accordance with an embodiment.

FIG. 3C shows a front view of a test support module in accordance with an embodiment.

FIG. 3C shows a front view of a test support module in a housing (e.g., a view onto a side of the support module which is intended to face a load board). Tips of the pogo pins (some or all of which are coupled to signal path inputs and/or signal path outputs and/or control connections and/or supply connections of the one or more support components) can be seen in the front view of the test support module.

However, it should be noted that the housing shown in FIG. 3C may optionally be supplemented by any of the features, functionalities and details disclosed herein, both individually or taken in combination.

FIGS. 4A-4D show implementations of a test support module 400 with a housing in accordance with an embodiment.

Figure 4A:
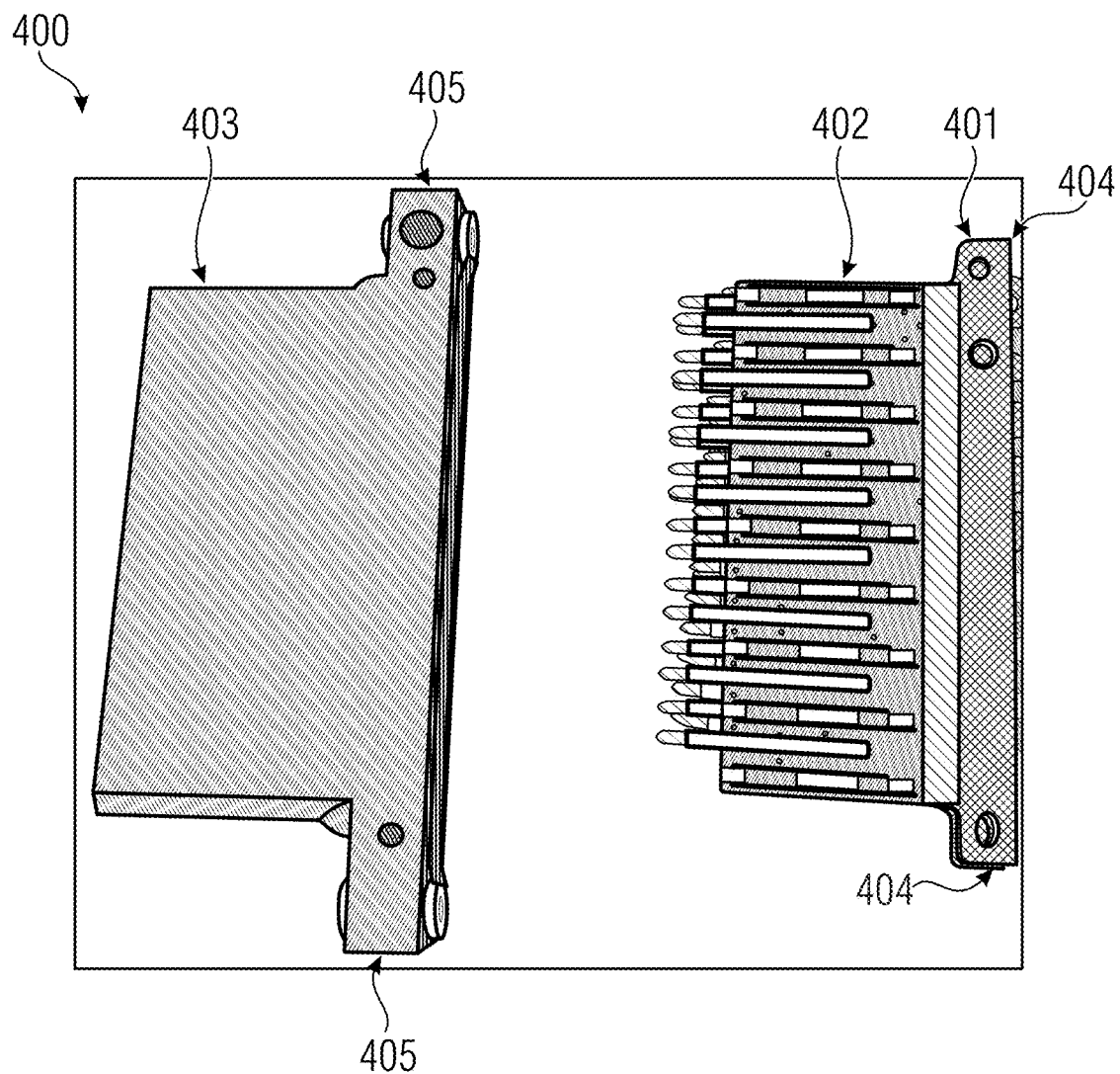
FIGS. 4A-4C show a test support module with a housing in accordance with an embodiment in different states of assembly.
Figure 4B:
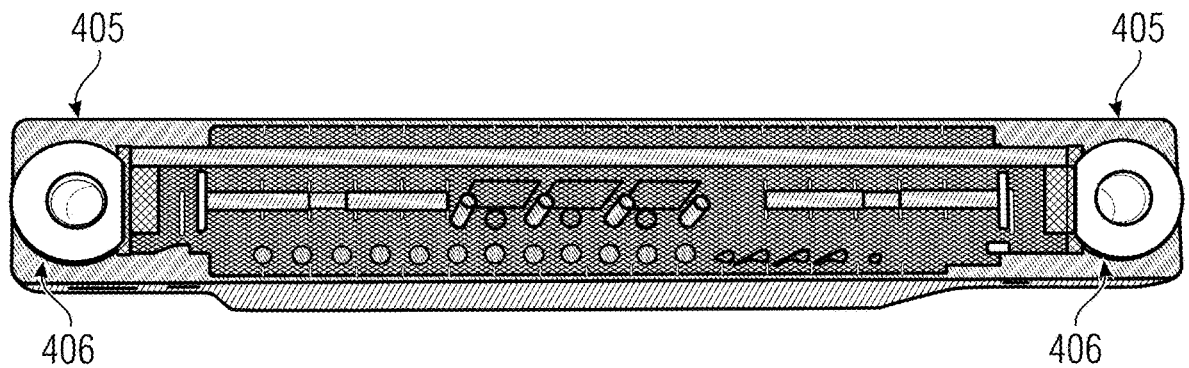

A top view of components of the test support module 400 is shown in FIG. 4A. The test support module 400 comprises at least one PCB 401 carrying pogo pins 402 and a housing 403. The at least one PCB 401 is formed in the same way, as the PCB shown in FIGS. 3A and 3B, and is adapted to be arranged in the housing 403, for example a plastic housing, or for example a metal housing, which fits into one or more pogo block positions. As shown in FIG. 4A, the test support module 400 includes two PCBs 401 carrying the pogo pins 402. However, this example is not limiting and the test support module 400 can comprise one PCB or more than two PCBs, for example arranged in one housing, in embodiments.

One or more electronic support components (e.g., one or more relays or one or more multiplexers, or one or more amplifiers) can be, for example, arranged on or in the PCB 401 (e.g., soldered onto the PCB or, for example, embedded in a PCB) and electrically coupled with the pogo pins 402 (e.g., via conductive traces of the PCB). The one of the one or more electronic support components may be electrically coupled with one or more of pogo pins 402, as it is shown, for example, in FIG. 2.

The at least one PCB 401 comprises two projections (or enlargings) 404 on two sides of the PCB 401 in a plane parallel to a plane of the pogo pins 402, the projections 404 comprise holes and can be used to fix the PCB 401.

As can be seen in FIG. 4A, the housing 403 also comprises side parts 405 projecting (or widening) in the plane of the pogo pins 402, the side parts 405 comprise holes 406, axes of which are parallel to the plane of the pogo pins 402. The holes 406 can be seen in FIG. 4E, which shows a rear view of the test support module 400. The holes 406 are adapted for fixation of the housing 403 of the test support module 400 in a test equipment (e.g., in one or more pogo block positions).

The pogo pins are, for example, arranged in a pattern which fits corresponding pads on the load board. As an example, the pogo pins may be arranged on regular grid, as can be seen in the top view of FIG. 4A (wherein some grid positions may be free from pogo pins). In other words, there may, for example, be a plurality of substantially parallel rows of pogo pins. However, in some embodiments, there may be one row of pogo pins on one PCB.

Figure 4C:
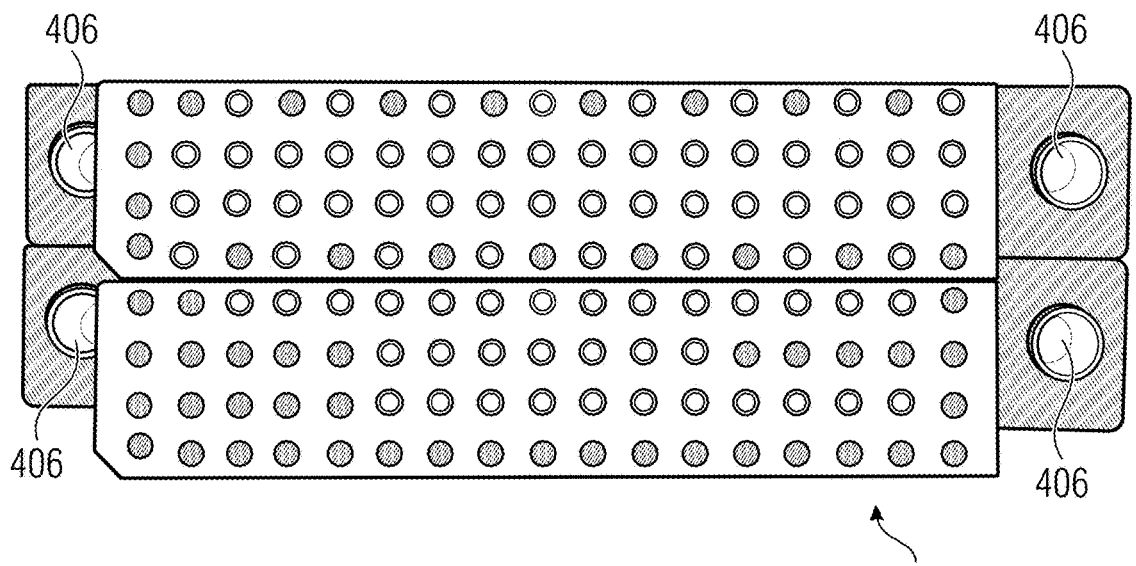

FIG. 4C shows a front view of a test support module which can comprise a single housing or multiple housings, e.g., a double housing, or e.g., a triple housing in accordance with an embodiment.

The housing 403 can comprise a different amount of holes 406, e.g., four holes 406, or e.g., less than four, or e.g., more than four holes 406, in embodiments.

However, it should be noted that the test support modules 400 may optionally be supplemented by any of the features, functionalities and details disclosed herein, both individually or taken in combination.

Figure 4D:
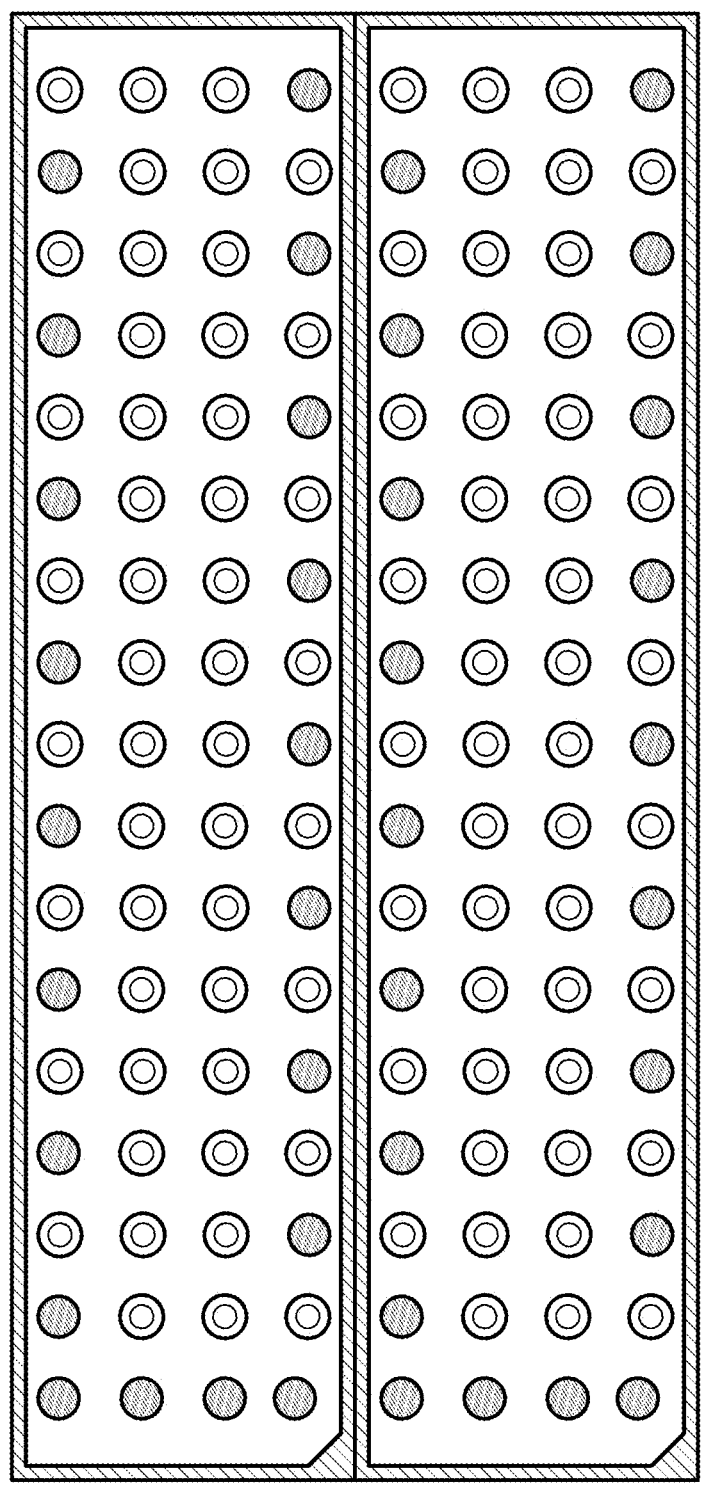
FIG. 4D shows a front view of a double housing in accordance with an embodiment.

FIG. 4D shows a double housing of a test support module in accordance with an embodiment.

FIG. 4D shows a front view of the double housing (e.g., a view onto a side of the support module which is intended to face a load board). Tips of the pogo pins (some or all of which are coupled to signal path inputs and/or signal path outputs and/or control connections and/or supply connections of the one or more support components) can be seen in the front view of the double housing.

However, it should be noted that the double housing shown in FIG. 4D may optionally be supplemented by any of the features, functionalities and details disclosed herein, both individually or taken in combination.

FIGS. 5-8 show different embodiments of a test support module, where different electronic support components are arranged in the test support module, particularly on or in a printed circuit board of the test support module.

FIGS. 5A-5E show test support modules 500A to 500B in accordance with an embodiment.

Figure 5A:
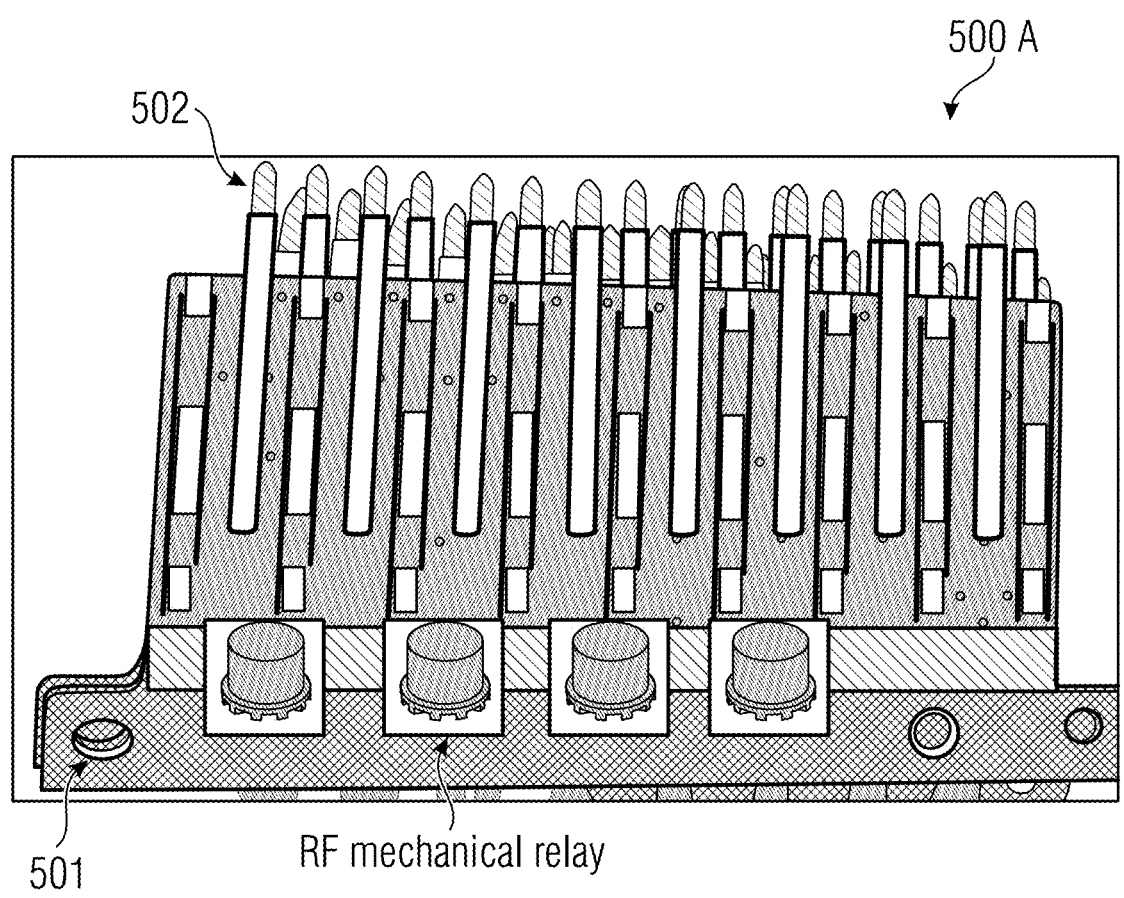
FIGS. 5A-5B show test support modules in accordance with embodiments.

FIG. 5A shows a top view of the test support module 500A comprising at least one PCB 501 carrying pogo pins 502. The structure of at least one PCB 501 is, for example, the same as of the PCB, shown in FIGS. 4A-4D.

At least one high speed instrument switch 508 is arranged in the printed circuit board 501 of the test support module 500A. The switch 508 is, for example, an RF mechanical relay 508, as shown in FIG. 5A.

Figure 5B:
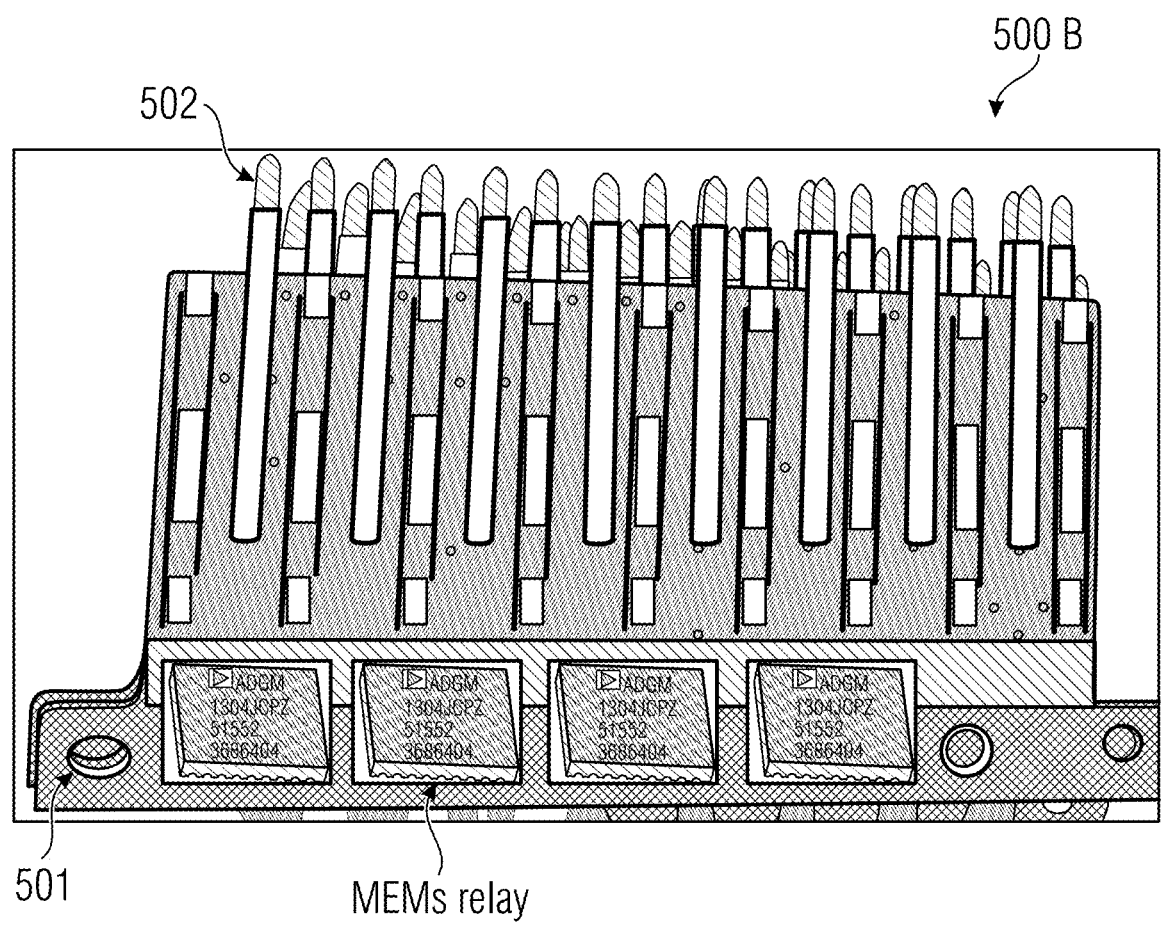

FIG. 5B shows a top view of the test support module 500B comprising at least one PCB 501 carrying pogo pins 502. The structure of at least one PCB 500B is, for example, the same as of the PCB, shown in FIGS. 4A-4D.

At least one high speed instrument switch 509 is arranged in the printed circuit board 501 of the test support module 500B. The switch 509 is, for example, mechanical MEMs relay 509, as shown in FIG. 5B.

The embodiments shown in FIGS. 5A and 5B have, as an example, four switches 508, 509 arranged on or in the PCB of the test support modules 500A and 500B.

Figure 5C:
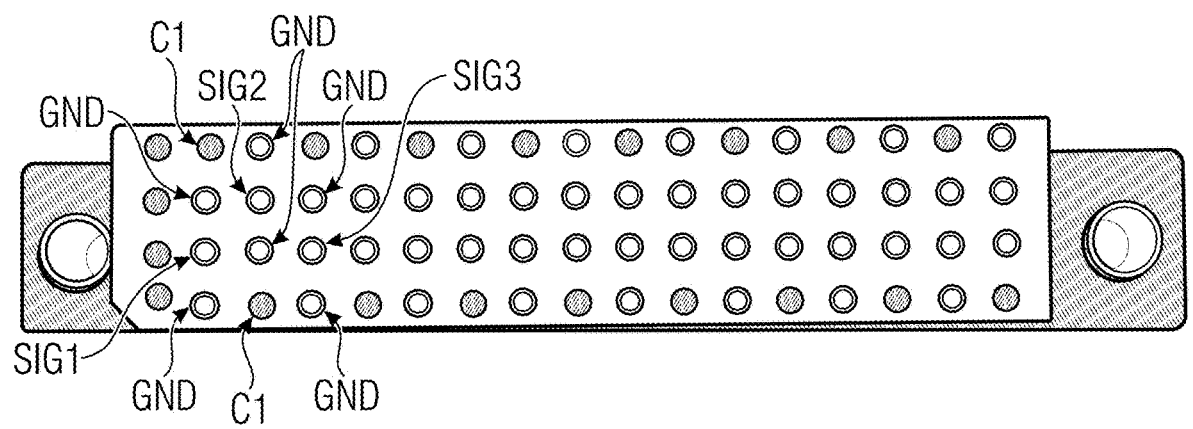
FIG. 5C shows a front view of a test support module in accordance with an embodiment.

FIG. 5C shows a front view of the test support modules 500A and 500B showing tips of the pogo pins 502 and illustrating connecting connection of the pogo pins 502 to a signal path.

Figure 5D:
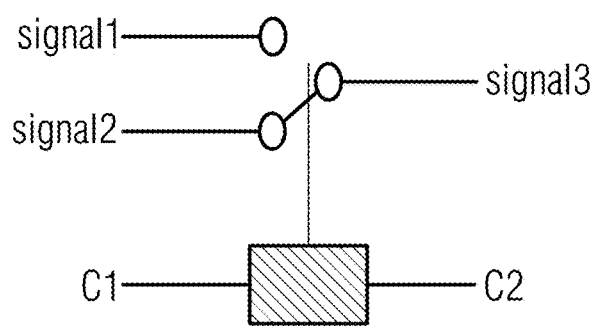
FIG. 5D shows a block schematic representation of a functionality of a test support module in accordance with an embodiment.

FIG. 5D shows a block schematic representation of a functionality of the test support modules 500A and 500E, which may serve as switches to selectably connect an input pogo pin to different output pogo pins, or vice versa.

Figure 5E:
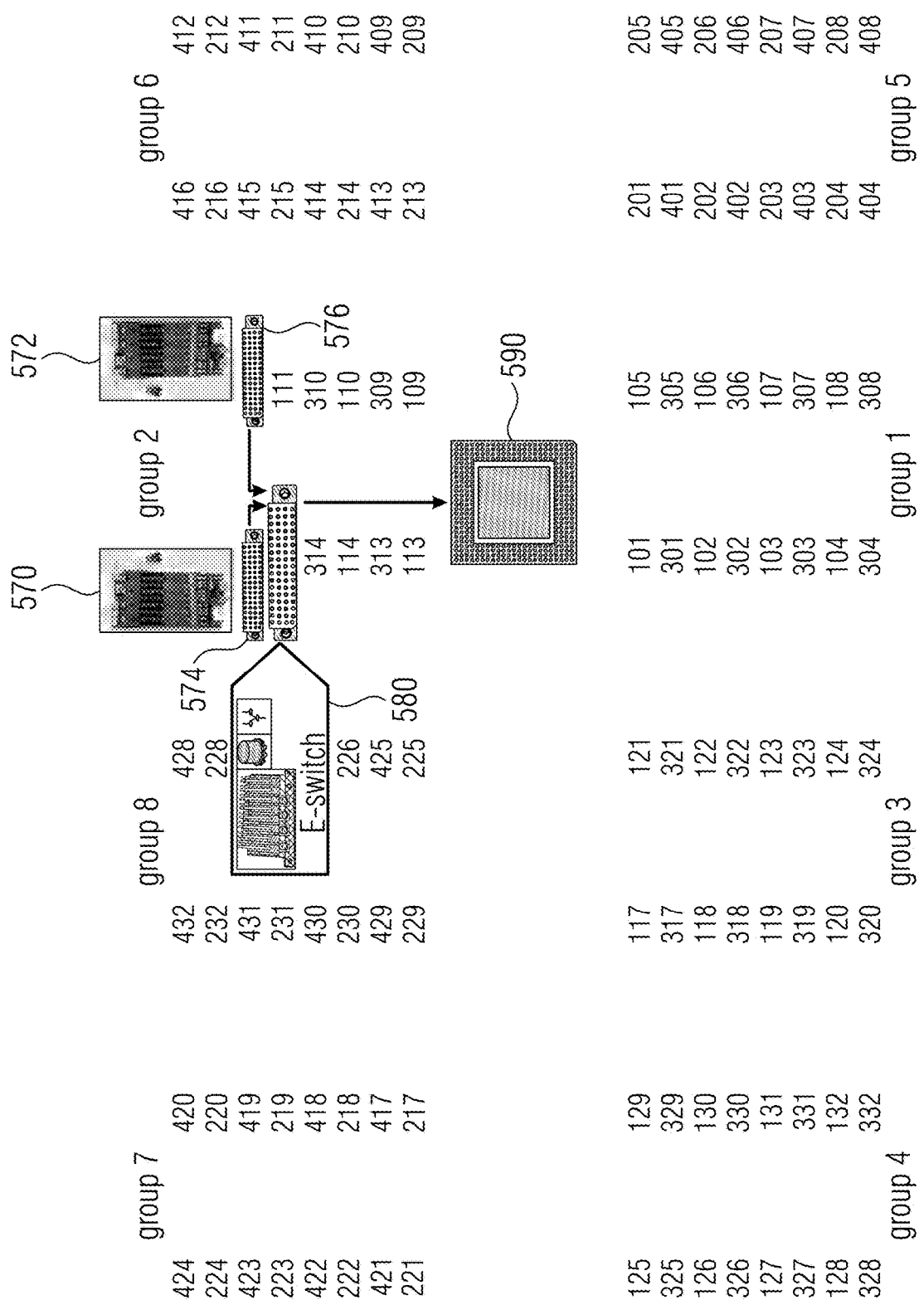
FIG. 5E shows a schematic representation of a test scenario using a support module according to an embodiment of the disclosure.

FIG. 5E illustrates a schematic representation of a test scenario using the support module 500A or 500B. As can be seen in FIG. 5E, two channel modules 570, 572 of the automated test equipment are coupled to the load board interface (comprising a pogo block frame having a plurality of pogo block positions) via cables. These cables (not shown) end at pogo blocks 574, 576, which comprise pogo pins for contacting the load board. The pogo blocks for establishing the connection to the channel modules are inserted in a pogo block frame. Moreover, a test support module 580, which corresponds to the test support modules described therein, is also inserted in a pogo block position of the pogo block frame. A connection between pogo pins of the pogo blocks 574, 576 and pogo pins of the test support module is established via routes 578 on the load board when the load board is attached. Moreover, a connection between pogo pins of the test support module 580 and pins of a device under test 590 is also established via routes 582 on the load board (and further via a test socket, or a pogo tower and a probe card).

The embodiment shown in FIGS. 5A-5E protects relays from high temperatures, which could be in a load board, e.g., 160° C., saves the space in the load board, for example, for high multi-site sockets, provides an independence of the relays from the load board and applications, provides a high bandwidth and signal integrity.

However, it should be noted that the test support modules 500A and 500B may optionally be supplemented by any of the features, functionalities and details disclosed herein, both individually or taken in combination.

FIGS. 6A-6D show a test support module 600 in accordance with an embodiment.

Figure 6A:
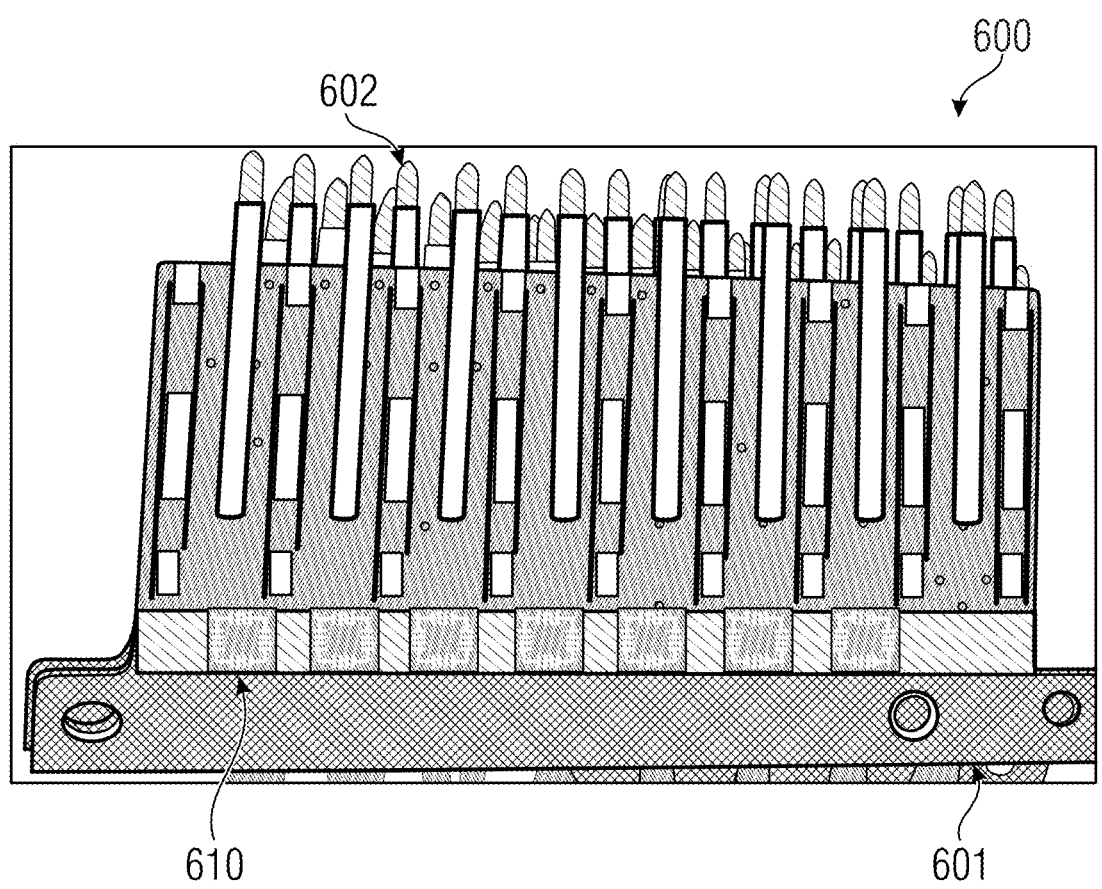
FIG. 6A shows a top view of a test support module in accordance with an embodiment.

FIG. 6A shows a top view of the test support module 600 comprising at least one PCB 601 carrying pogo pins 602. The structure of at least one PCB 601 is the same as of the PCB, shown in FIGS. 4A-4D.

Figure 6B:
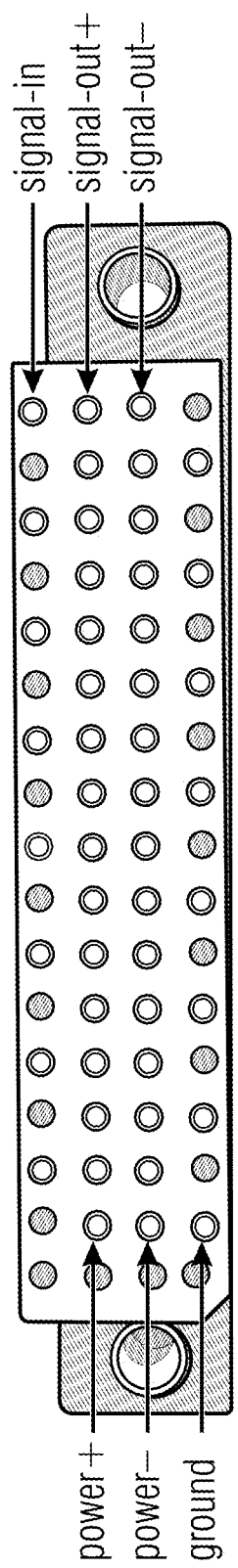
FIG. 6B shows a front view of a test support module in accordance with an embodiment.

The test support module 600 comprises at least one amplifier 610 arranged on or in the printed circuit board 601 of the test support module 600. FIG. 6A shows a top view of the test support module 600. The embodiment shown in FIG. 6A has, for example, seven amplifiers 610 arranged on or in the PCB (e.g., soldered onto the PCB or, for example, embedded in a PCB) of the test support module 600. FIG. 6B shows a front view of the test support module 600 showing tips of the pogo pins 602 and illustrating connection of pogo pins to a signal path.

Figure 6C:
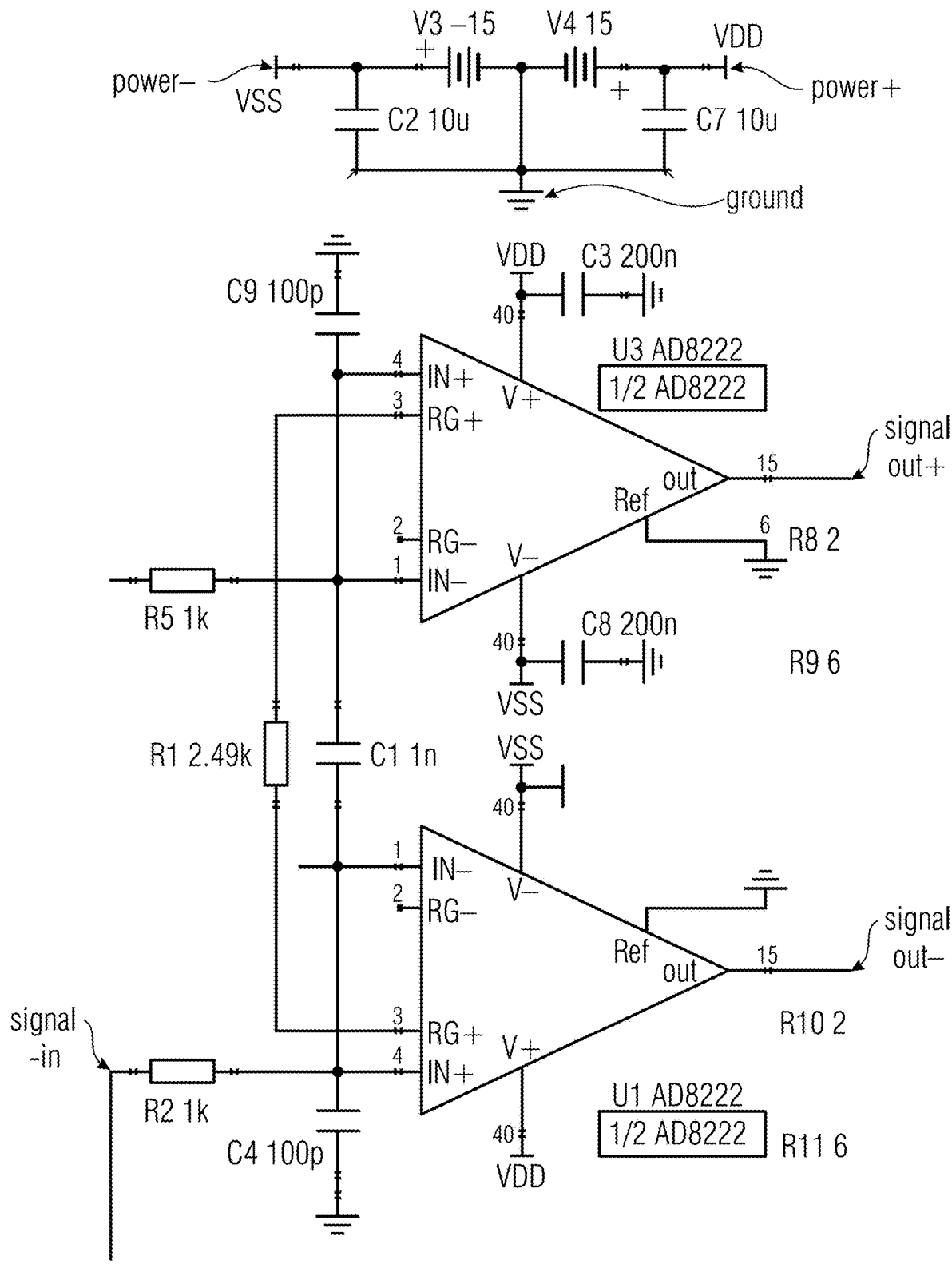
FIG. 6C shows a schematic of a circuitry which can be implemented on a test support module in accordance with an embodiment.

FIG. 6C shows a schematic of a circuitry which can be implemented on the test support module 600.

Figure 6D:
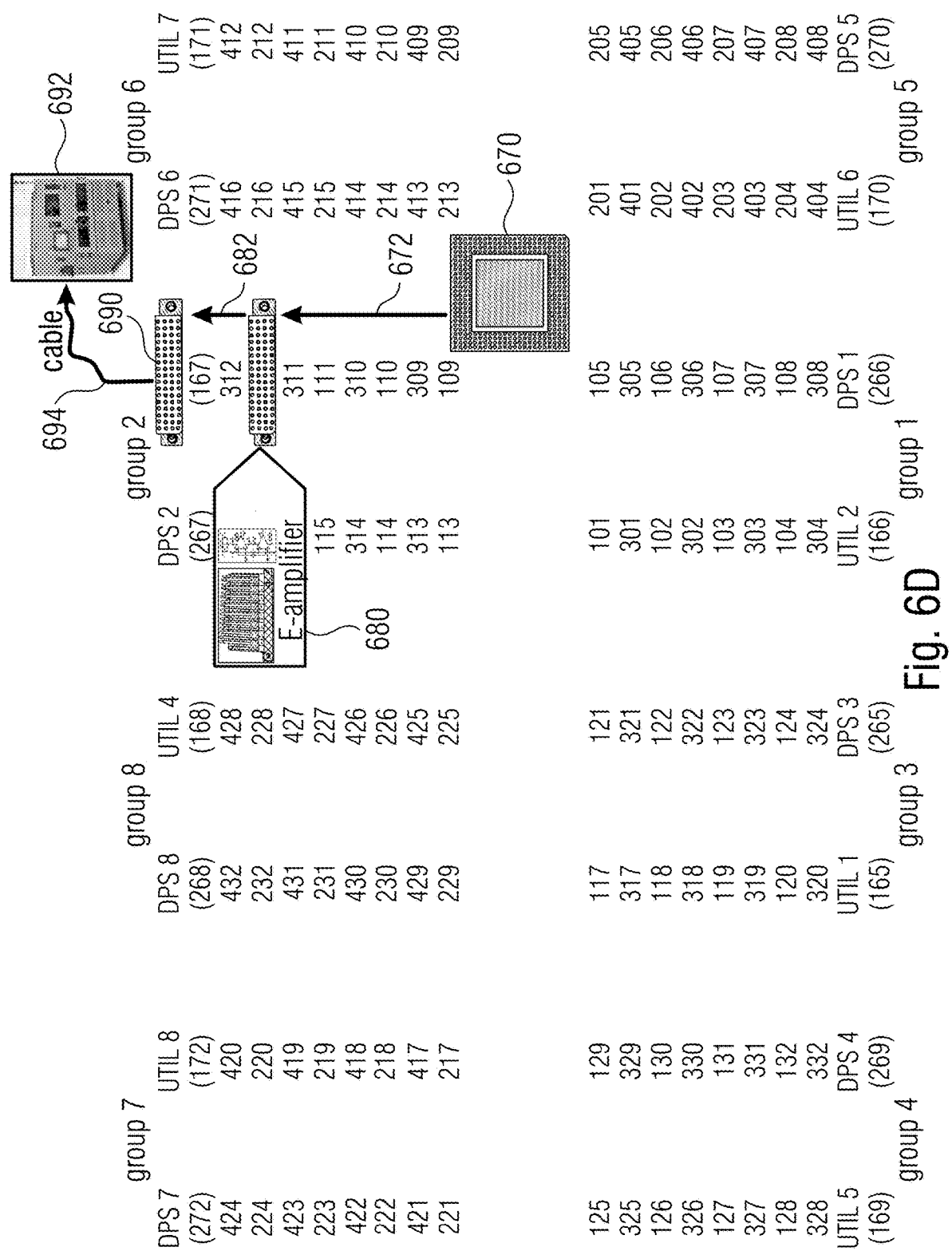
FIG. 6D shows a schematic representation of a test scenario using a test support module according to an embodiment of the disclosure.

FIG. 6D illustrates a schematic representation of a test scenario using the test support module 600. As can be seen in FIG. 6D, pins of a device under test 670 are coupled with input pins of a test support module 680/which may correspond to the test support module 600) via a route (trace) 672 on the load board. Moreover, output pins of the test support module 680 are coupled with pins of a pogo block 690 via traces (or routes) 682 on the load board. The pogo block is, for example, coupled with one or more external handling equipment 692 of the automated test equipment via cables 694. The pogo block 690 that is connected to cables that are going to the external equipment 692, e.g., handler. Both the test support module 680 and the pogo block 690 are inserted in pogo block positions of the pogo block frame.

The embodiment shown in FIGS. 6A-6D protects an amplifier from high temperatures, which could be in a load board, e.g., 160° C., saves the space in the load board, for example, for high multi-site sockets, provides an independence from the load board and applications, provides a high bandwidth and signal integrity.

However, it should be noted that the test support module 600 may optionally be supplemented by any of the features, functionalities and details disclosed herein, both individually or taken in combination.

Figure 7A:
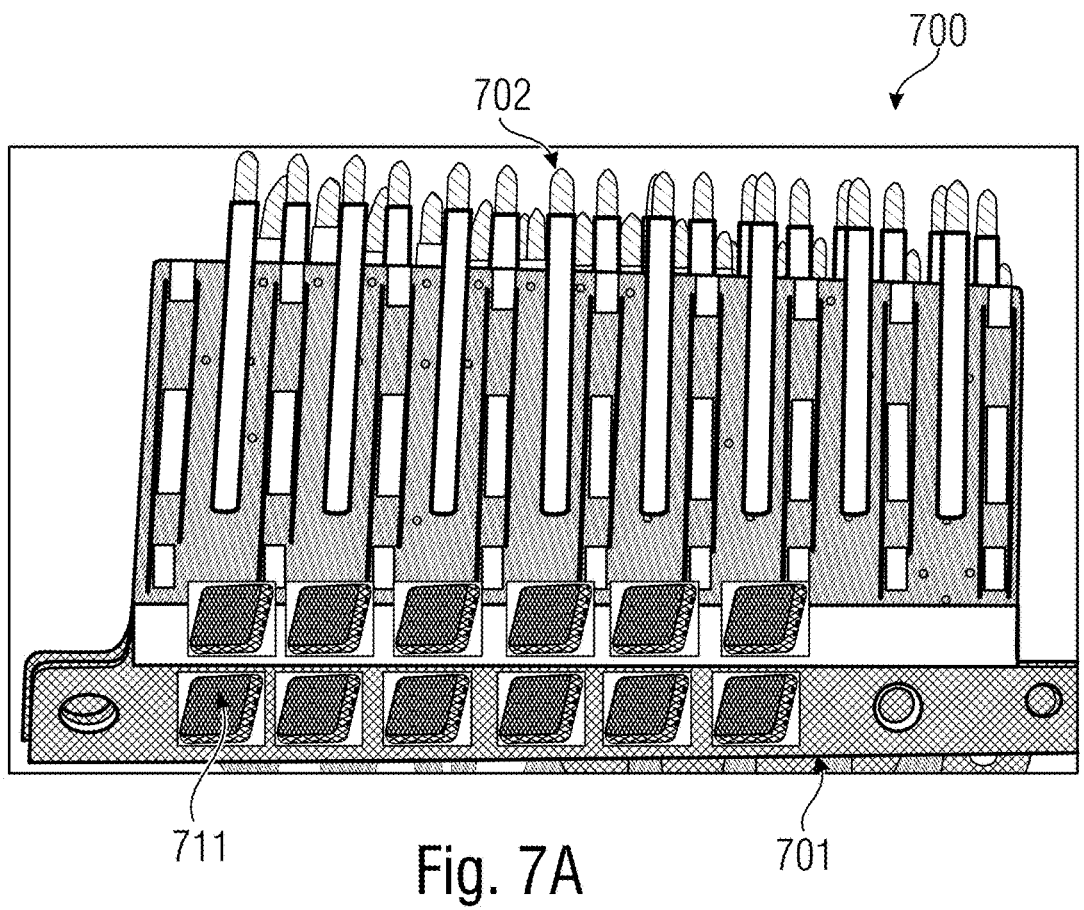
FIG. 7A shows a top view of a test support module in accordance with an embodiment.
Figure 7B:
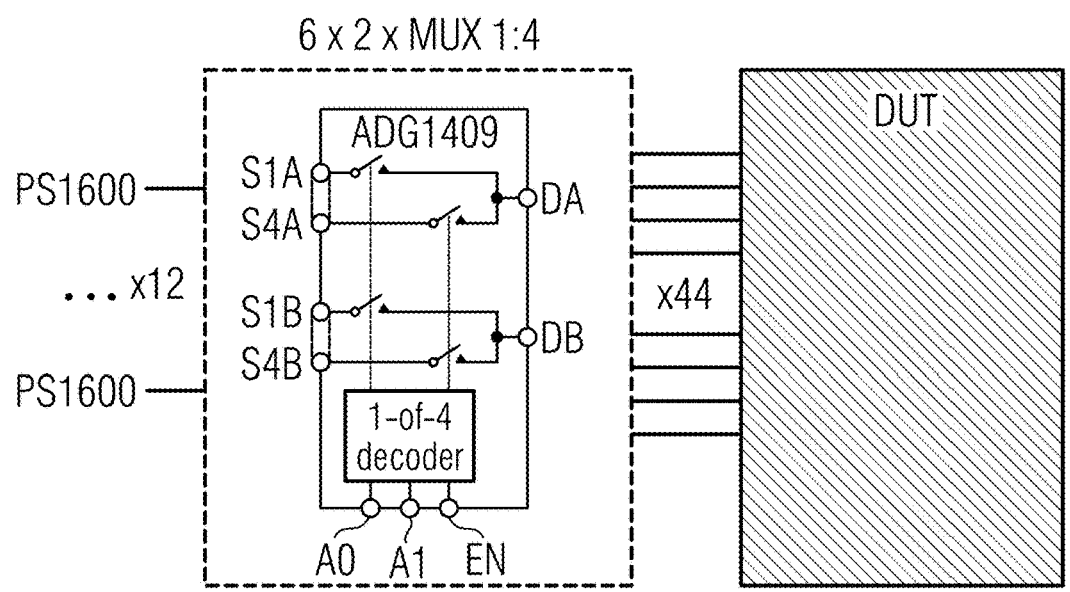
FIG. 7B shows a block schematic diagram of a circuit which can be implemented on a test support module in accordance with an embodiment.
Figure 7C:
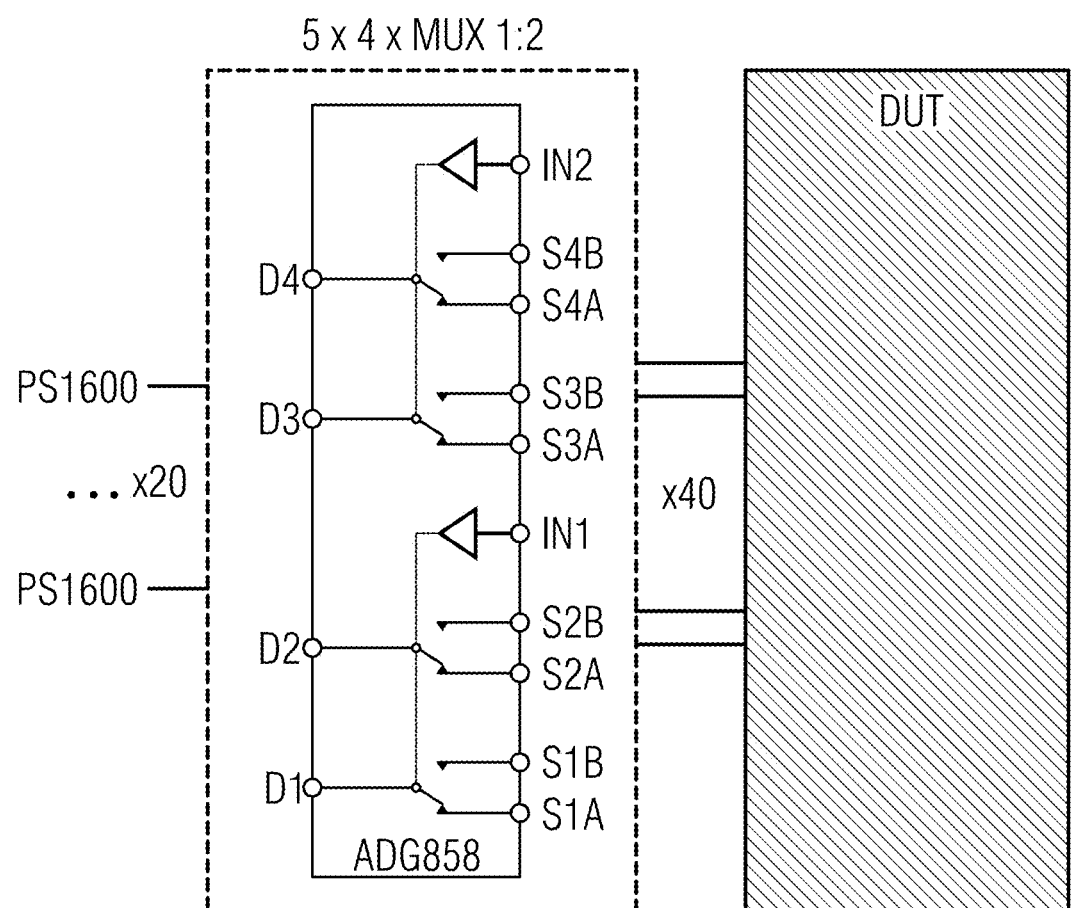
FIG. 7C shows a block schematic diagram of a circuit which can be implemented on a test support module in accordance with an embodiment.

FIGS. 7A-7C show a test support module 700 in accordance with an embodiment.

FIG. 7A shows a top view of the test support module 700 comprising at least one PCB 701 carrying pogo pins 702. The structure of at least one PCB 701 is, for example, the same as of the PCB, shown in FIGS. 4A-4D.

The test support module 700 comprises at least one multiplexer 711 arranged in the printed circuit board 701 of the test support module 700. FIG. 7A shows a top view of the test support module 700. As shown in FIG. 7A, for example, twelve multiplexers 711 are arranged in two rows of six multiplexers on or in the PCB 701 of the test support module 700. The multiplexers 711 can be DC, for example, channel multiplexers, e.g., ADG858.

FIG. 7B shows a block schematic diagram of a circuit which can be implemented on the test support module 700. A multiplexing functionality of a 4-to-1 multiplexer is presented. Such functionality saves, for example, 3×ATE channels.

FIG. 7C shows a block schematic diagram of a circuit which can be implemented on the test support module 700. A multiplexing functionality of a 2-to-1 multiplexer is shown. Such functionality saves, for example, 1×ATE channel.

The embodiment shown in FIGS. 7A-7C saves an amount of ATE channels to be used, saves the space in the load board, for example, for high multi-site sockets, provides an independence from the load board and applications.

However, it should be noted that the test support module 700 may optionally be supplemented by any of the features, functionalities and details disclosed herein, both individually or taken in combination.

Figure 8A:
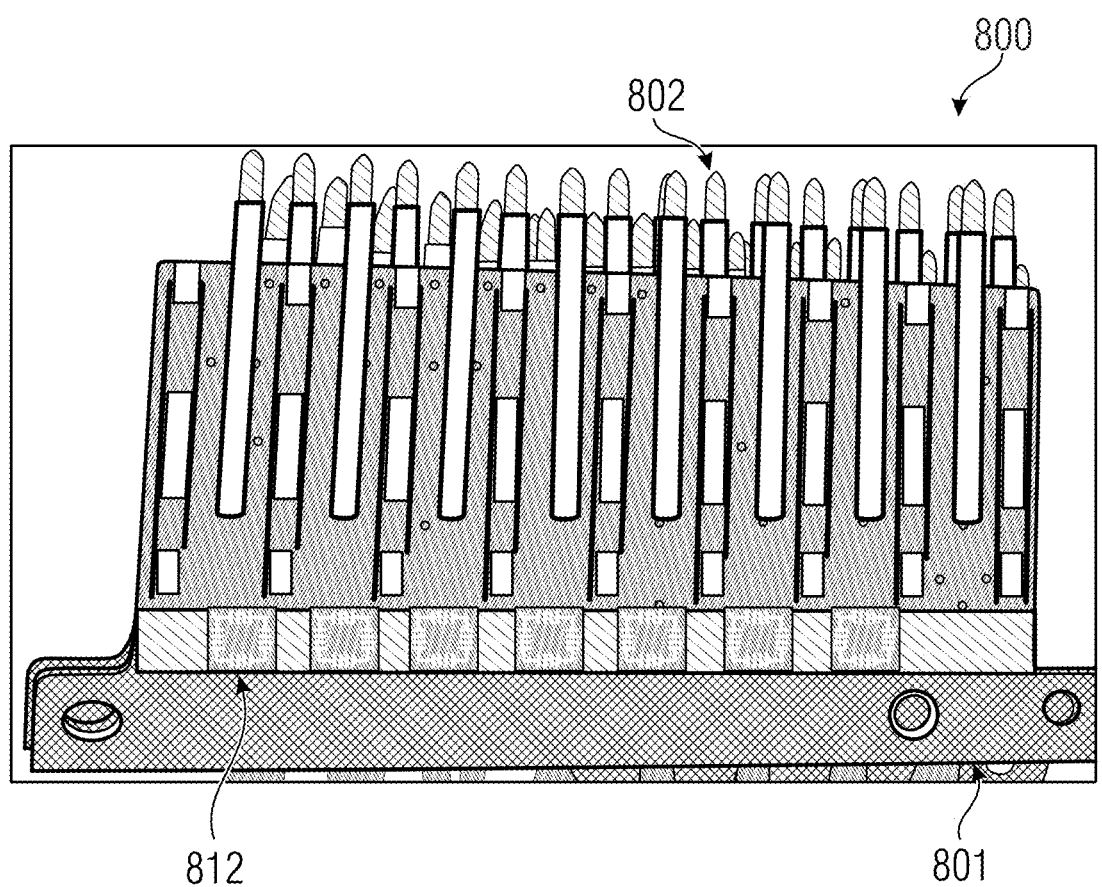
FIG. 8A shows a top view of a test support module in accordance with an embodiment.
Figure 8B:
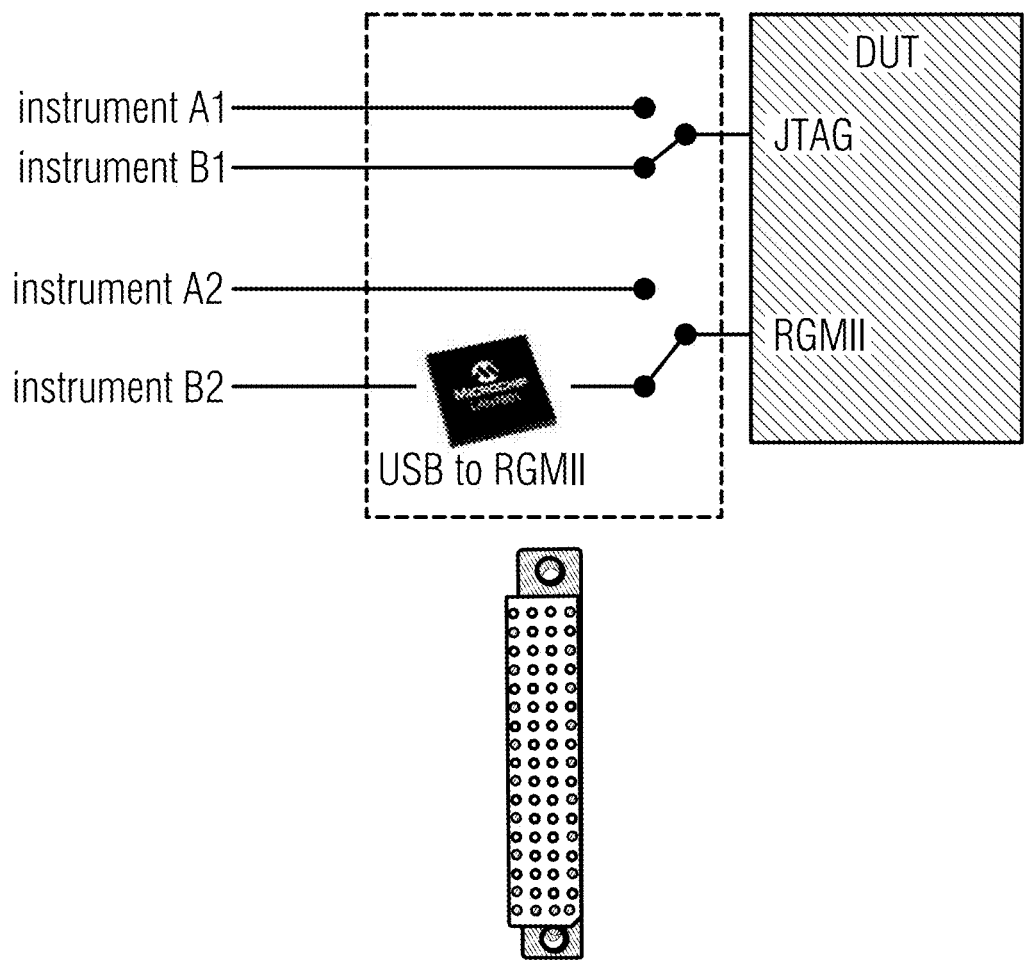
FIG. 8B shows a block schematic diagram of a circuit which can be implemented on a test support module in accordance with an embodiment.

FIGS. 8A-8B show a test support module 800 in accordance with an embodiment.

FIG. 8A shows a top view of the test support module 800 comprising at least one PCB 801 carrying pogo pins 802. The structure of at least one PCB 801 is the same as of the PCB, shown in FIGS. 4A-4D.

The test support module 800 comprises at least one protocol converter 812 arranged in the printed circuit board 801 of the test support module 800. FIG. 8A shows a top view of the test support module 800. As shown in FIG. 8A, for example, seven protocol converters 812 are arranged in the PCB 801 of the test support module 800. The protocol converters 812 can be, for example, USB to RGMII converters and can be, for example, also combined with JTAG switches.

FIG. 8B shows a block schematic diagram of a circuit which can be implemented on the test support module 800.

The embodiment shown in FIGS. 8A-8E provides an adapter to expand capability and adjust to application, whereas reducing complex LBA wiring and maintaining high signal performance. A load board space saving and a protection of components from high temperatures is also provided.

However, it should be noted that the test support module 800 may optionally be supplemented by any of the features, functionalities and details disclosed herein, both individually or taken in combination.

Figure 9A:
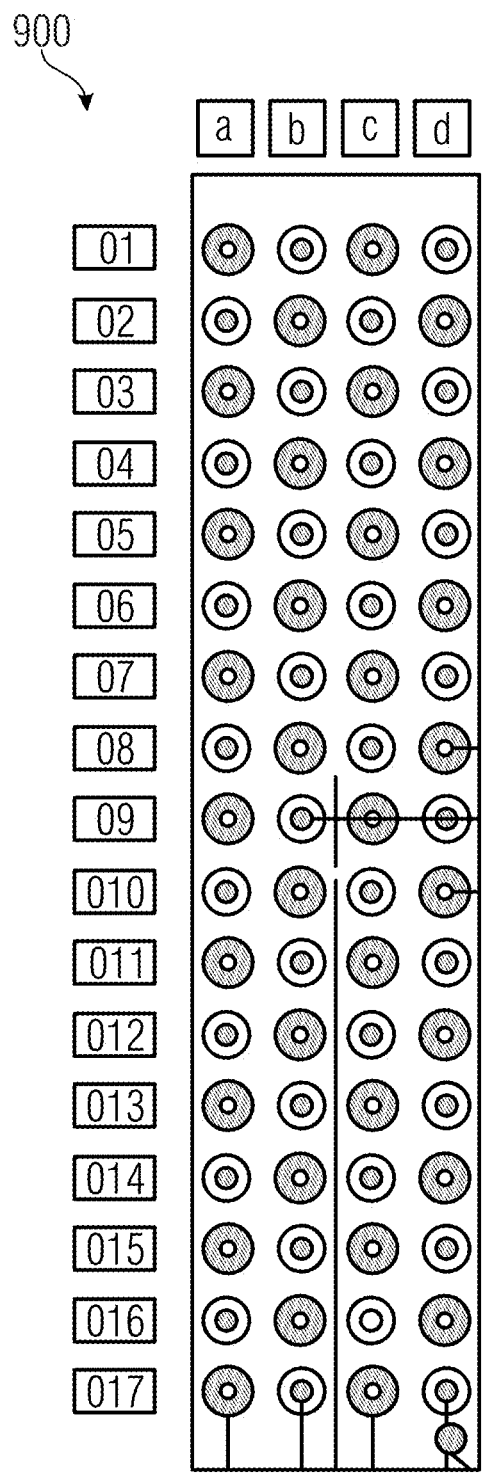
FIG. 9A shows a circuit diagram of a test support module in accordance with an embodiment.
Figure 9C:
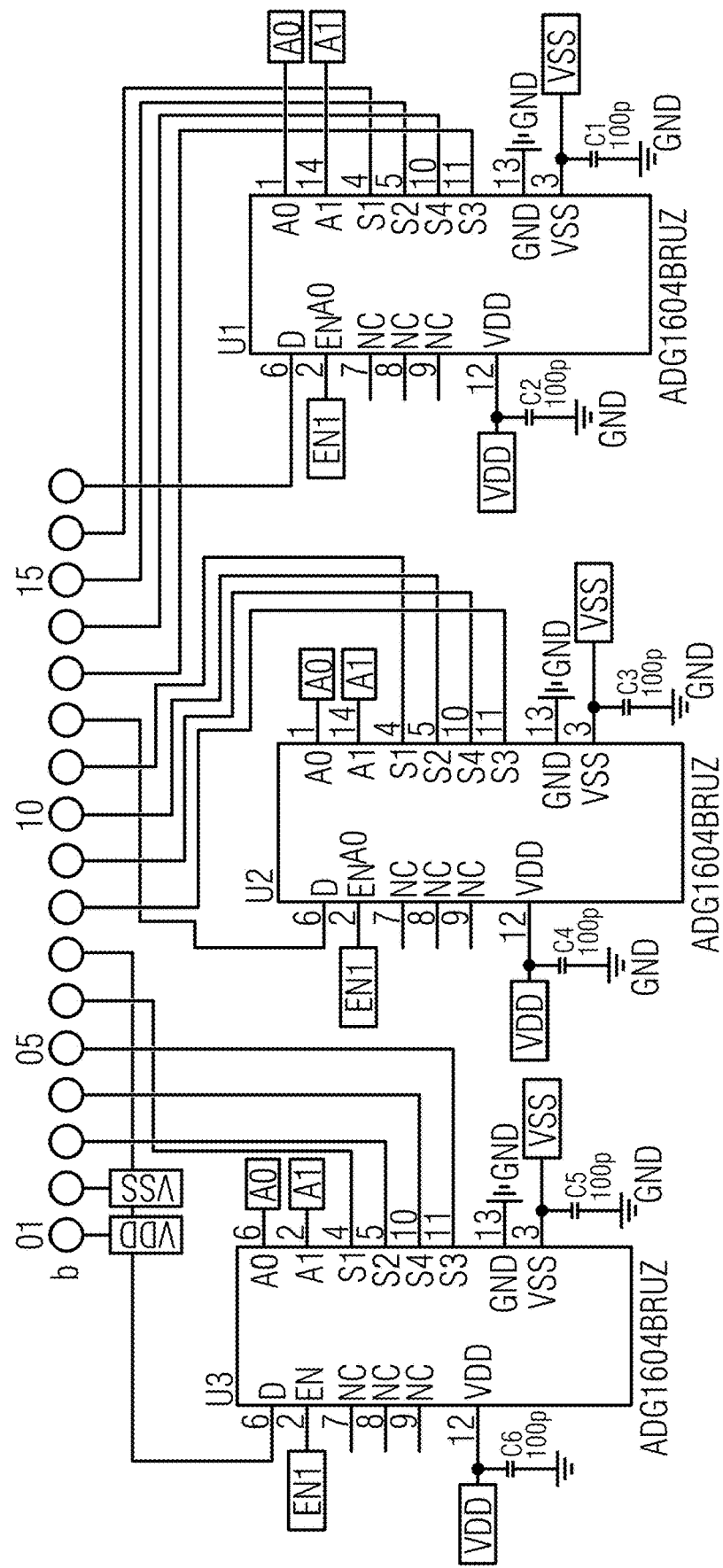
FIG. 9C shows a schematic of circuitry which can be implemented on a test support module in accordance with an embodiment.

FIGS. 9A-9C show pogo pins arrangement and connection in a test support module 900 in accordance with an embodiment.

FIG. 9A shows diagram schematic front view of the test support module 900 in accordance with an embodiment. Tips of pogo pins are shown, which are arranged in a grid of, for example, 4 rows, each row having, for example, 17 pogo pins.

FIG. 9A schematically represents a front view of the test support module in accordance with an embodiment. Tips of pogo pins are shown to illustrate the pogo pins arrangement. The pogo pins are arranged in four rows of 17 pogo pins.

FIG. 9B shows a table illustrating a pin assignment of the test support module 900. As could be seen in FIG. 9B, the pogo pins are arranged on or in two PCBs, e.g., PCB1 and PCB2.

FIG. 9C shows a schematic of a circuitry which can be implemented on the test support module 900. FIG. 9C shows about 25% of the whole test support module, i.e., a circuitry connected to one row of the pogo pins. There are, for example, three multiplexers connected with the pogo pins 1-17. These multiplexers are correspondingly arranged on or in a PCB of the test support module 900 and electrically coupled with the pogo pins, as it is shown, for example, in FIG. 9C. Input signals of the multiplexers, control signals of the multiplexers and supply voltages are all provided via the pogo pins. Outputs of the multiplexers are also coupled with pogo pins.

The test support module 900, generally speaking, supports a test of a DUT, for example by providing a multiplexing functionality.

However, it should be noted that the test support module 900 may optionally be supplemented by any of the features, functionalities and details disclosed herein, both individually or taken in combination.

Figure 10:
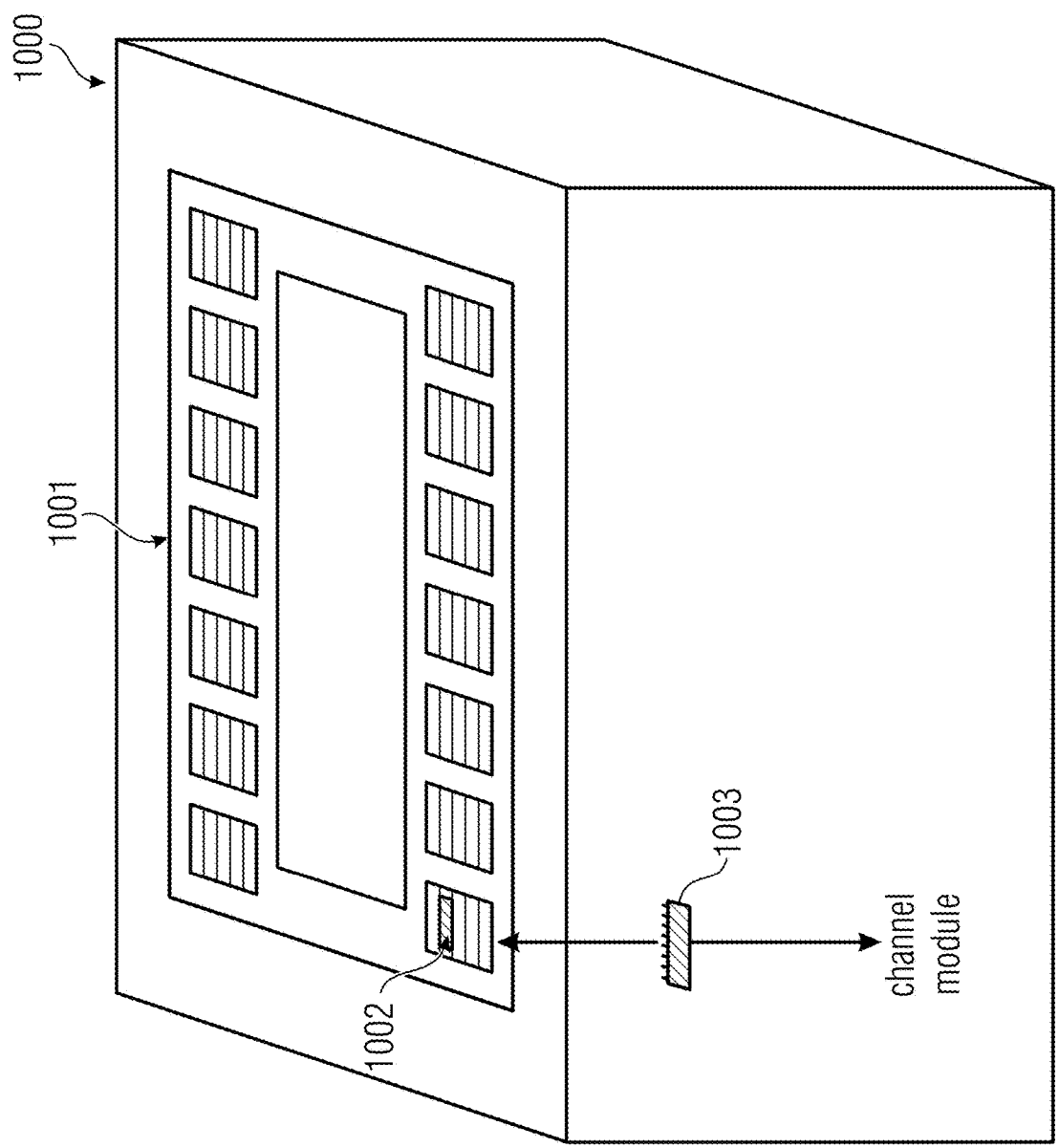
FIG. 10 shows a test arrangement in accordance with an embodiment.

FIG. 10 shows a test arrangement 1000 in accordance with an embodiment.

The test arrangement 1000 comprises a pogo block frame 1001 which comprises a plurality of pogo blocks positions, or pogo block locations (e.g., cut-outs or openings adapted to receive pogo blocks or test support modules). One or more pogo blocks 1003 comprising pogo pins and cables for establishing connection with one or more channel modules, e.g., pin electronics cards, of the test arrangement 1000 are arranged in one or more of the pogo block positions. One or more test support modules 1002 according to any of the above described embodiments, for example, shown in FIGS. 3-9, are arranged in one or more of the pogo block positions. It should be noted that the test support modules 1002 are (mechanically) adapted to be inserted into one or more pogo block positions of the pogo block frame 1001. For example, an outer shape of the test support modules 1002 may be chosen to fit into the pogo block positions. Also, the test support modules 1002 may comprise appropriate fastening means to fasten the support modules in the pogo block positions. As an example, the test support modules 1002 may comprise holes or threaded holes (not shown) on its front side (e.g., the side shown in FIG. 3A) to fasten the test support modules 1002 in the pogo block positions (e.g., using a plurality of screws). Alternatively or in addition, the test support modules may comprise one or more snap-in components to snap-fix the support module in one or more pogo block locations.

The pogo pins of the one or more pogo blocks 1003 and the pogo pins of the one or more test support modules 1002 (when inserted into the pogo block frame) are arranged to contact a load board, e.g., when the load board is attached to the test arrangement. The pogo pins of the one or more pogo blocks 1003 and the pogo pins of the one or more test support modules 1002 are, for example, arranged in a pattern which fits corresponding pads on the load board.

However, it should be noted that the test arrangement 1000 may optionally be supplemented by any of the features, functionalities and details disclosed herein, both individually or taken in combination.

Figure 11:
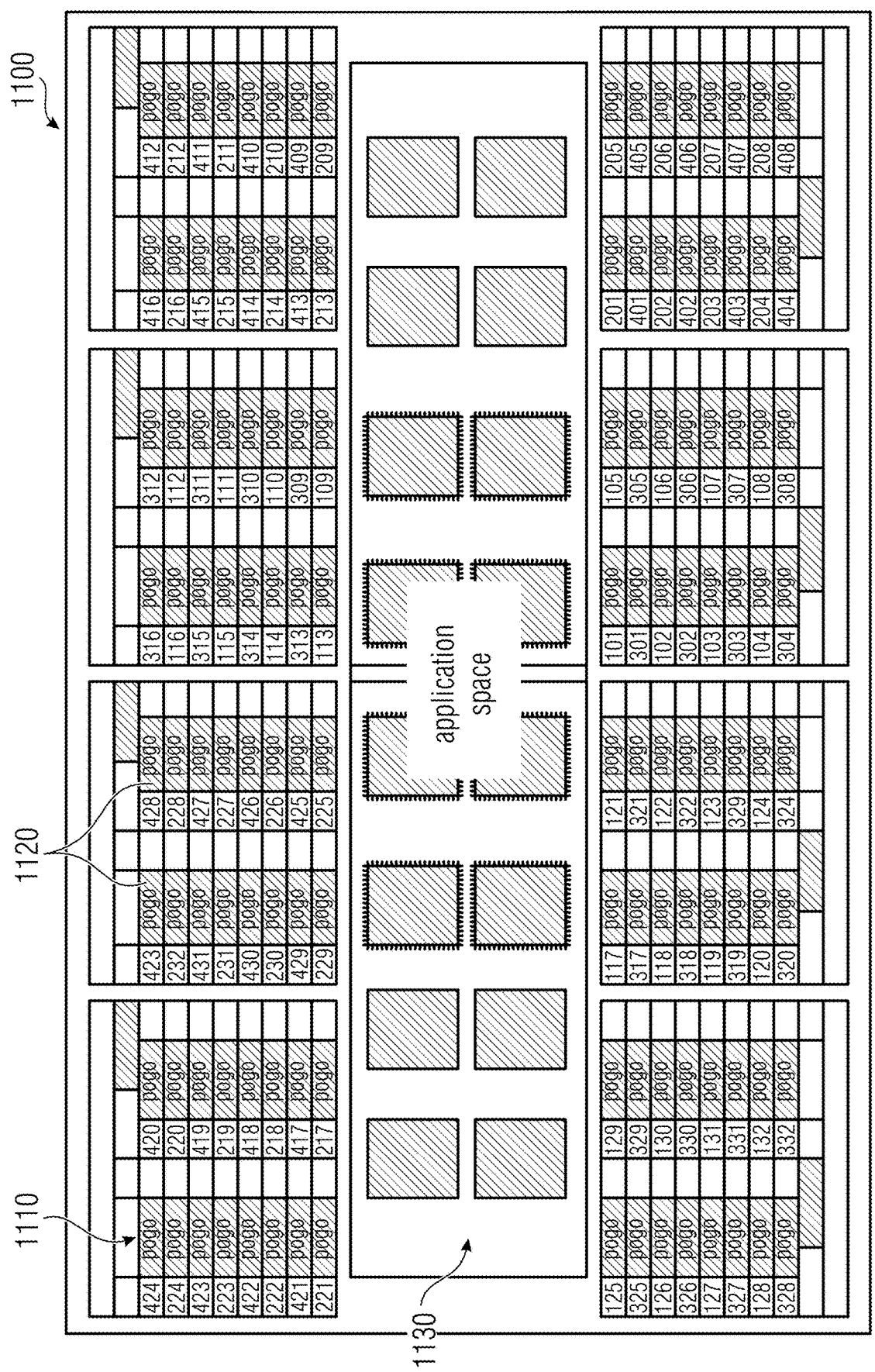
FIG. 11 shows a pogo block frame in accordance with an embodiment.

FIG. 11 shows a pogo block frame 1100 in accordance with an embodiment. The pogo block frame 1100 could be used, for example, in a test arrangement 1000 shown in FIG. 10.

The pogo block frame 1100 comprises a plurality of pogo blocks positions 1110, or pogo block locations. One or more pogo blocks 1120 comprising pogo pins and cables for establishing connection with one or more channel modules, e.g., pin electronics cards, of a test arrangement, for example the test arrangement 1000 shown in FIG. 10, are arranged in one or more of the pogo block positions 1110.

Upon using the pogo block frame 1100 in a test arrangement, one or more test support modules of a corresponding test arrangement according to any of the above described embodiments, for example, shown in FIGS. 3-9, are arranged in one or more of the pogo block positions 1110.

The pogo pins of the one or more pogo blocks 1120 and the pogo pins of the one or more test support modules are arranged to contact a load board, e.g., when the load board is attached to the test arrangement.

The one or more pogo blocks 1120 are, for example, grouped in groups of 8 pogo blocks.

The one or more pogo blocks 1120 are, for example, arranged in a peripheral area of the pogo block frame 1100. The one or more pogo blocks 1120 are arranged, for example, in several rows along edges of the pogo block frame 1100. As shown in FIG. 11, the pogo blocks 1120 are, for example, arranged in 8 rows along a long side of the pogo block frame 1100. The pogo blocks 1120 are, for example, arranged in 16 columns along a short side of the pogo block frame 1100, 8 columns in a first peripheral area of the short side and 8 columns in a second peripheral are of the short side.

The pogo block frame has an application space 1130 in a central area. The application space is free from the one or more pogo blocks 1120. The application space is arranged opposite to a corresponding central area of the load board, e.g., when the load board is attached to the test arrangement.

However, it should be noted that the pogo block frame 1100 may optionally be supplemented by any of the features, functionalities and details disclosed herein, both individually or taken in combination.

Figure 12:
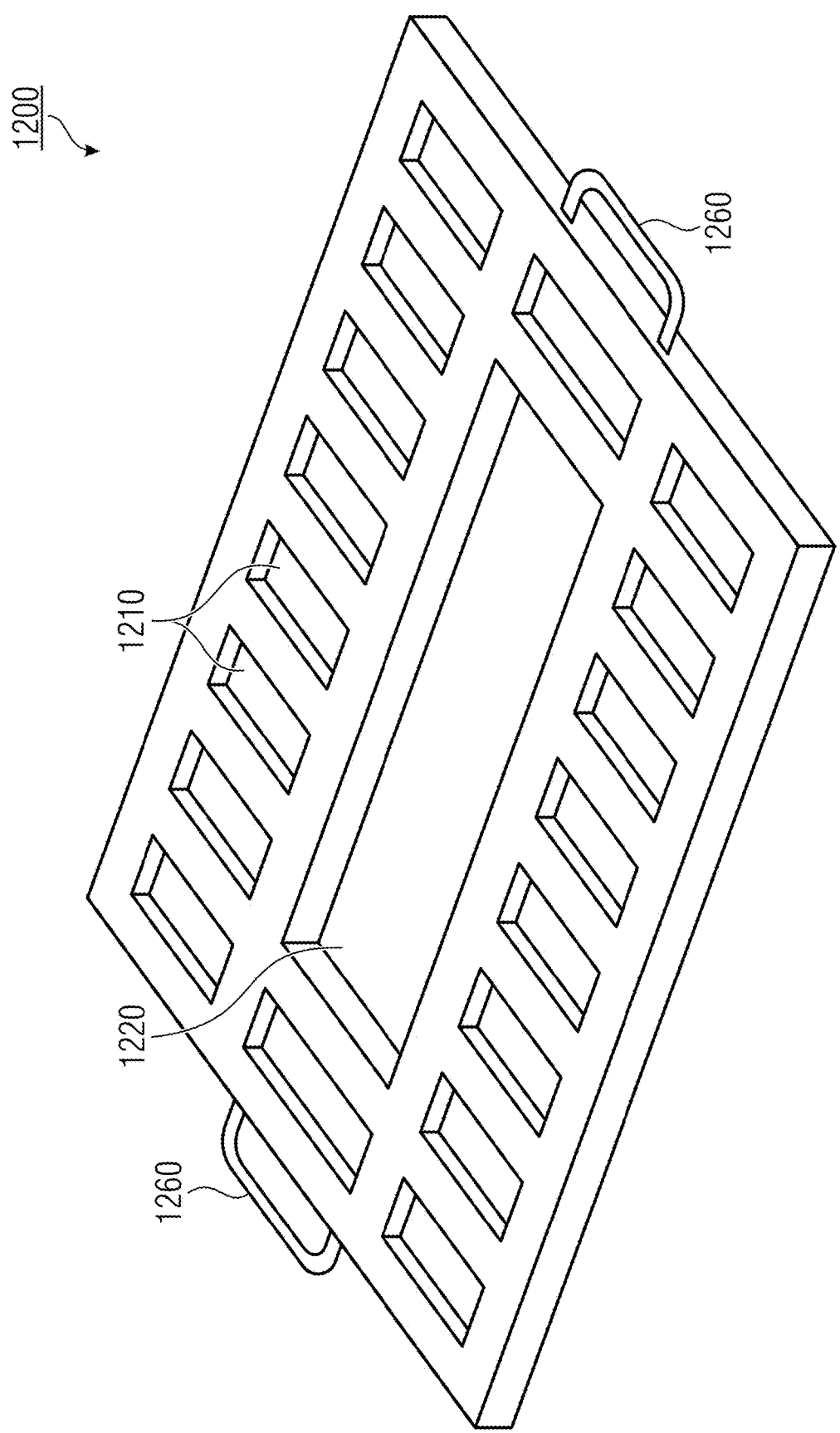
FIG. 12 shows a support structure for a load board in accordance with an embodiment.

FIG. 12 shows a support structure 1200, e.g., a stiffener, for a load board in accordance with an embodiment.

The support structure 1200 is implemented as a frame, for example as a metal frame, e.g., of a rectangular form, comprising longitudinal and transverse bars, or ribs, which form a closed external contour of the support structure 1200. The external contour of the support structure 1200 has a rectangular form.

The support structure 1200 is divided into the sections 1210, e.g., 8 sections, or e.g., 4 sections, or e.g., 2 section, or e.g., 1 section, any other amount of sections, to correspond to the structure of the pogo block frame in order to align the pogo pin blocks with corresponding sockets (or pads) on or in the load board. A large central section 1220 that is formed in a central part of the support structure 1200 corresponds to an application space of the pogo block frame and/or the load board.

A load board to be installed in a test arrangement is arranged on the support structure 1200. The support structure 1200 comprises handles 1260, e.g., metal handles, used to easily install or remove a load board mounted on the support structure 1200 on a test arrangement.

Test support modules, e.g., the test support modules shown in FIGS. 3-9 fit into the sections 1210 of the support structure 1200. For example, front portions of the test support modules (and also of pogo blocks) (e.g., portions equipped with pogo pins) may extent into the sections 1210 to contact the load board when the support structure 1200 approximates the pogo block frame. The test support modules are arranged movable up and down (e.g., together with a pogo block frame carrying the test support modules and further pogo blocks), e.g., movable up to connect to a load board fixed on the support structure 1200, upon arranging the support structure 1200 with the load board mounted on it on a test arrangement, e.g., a test module, e.g., as shown in FIG. 10.

However, it should be noted that the support structure 1200 may optionally be supplemented by any of the features, functionalities and details disclosed herein, both individually or taken in combination.

Figure 13A:
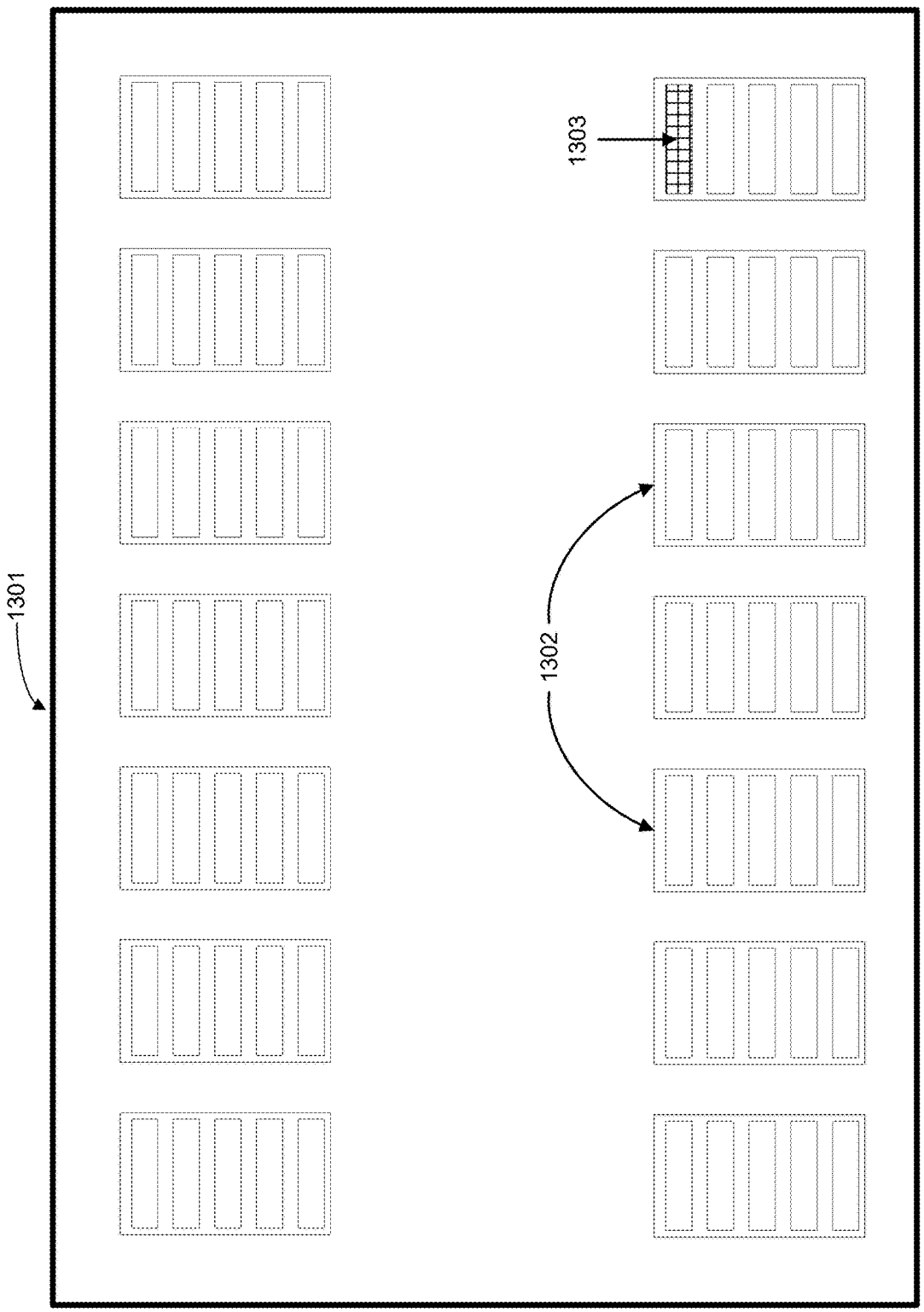
FIG. 13A shows a test arrangement in accordance with an embodiment.
Figure 13B:
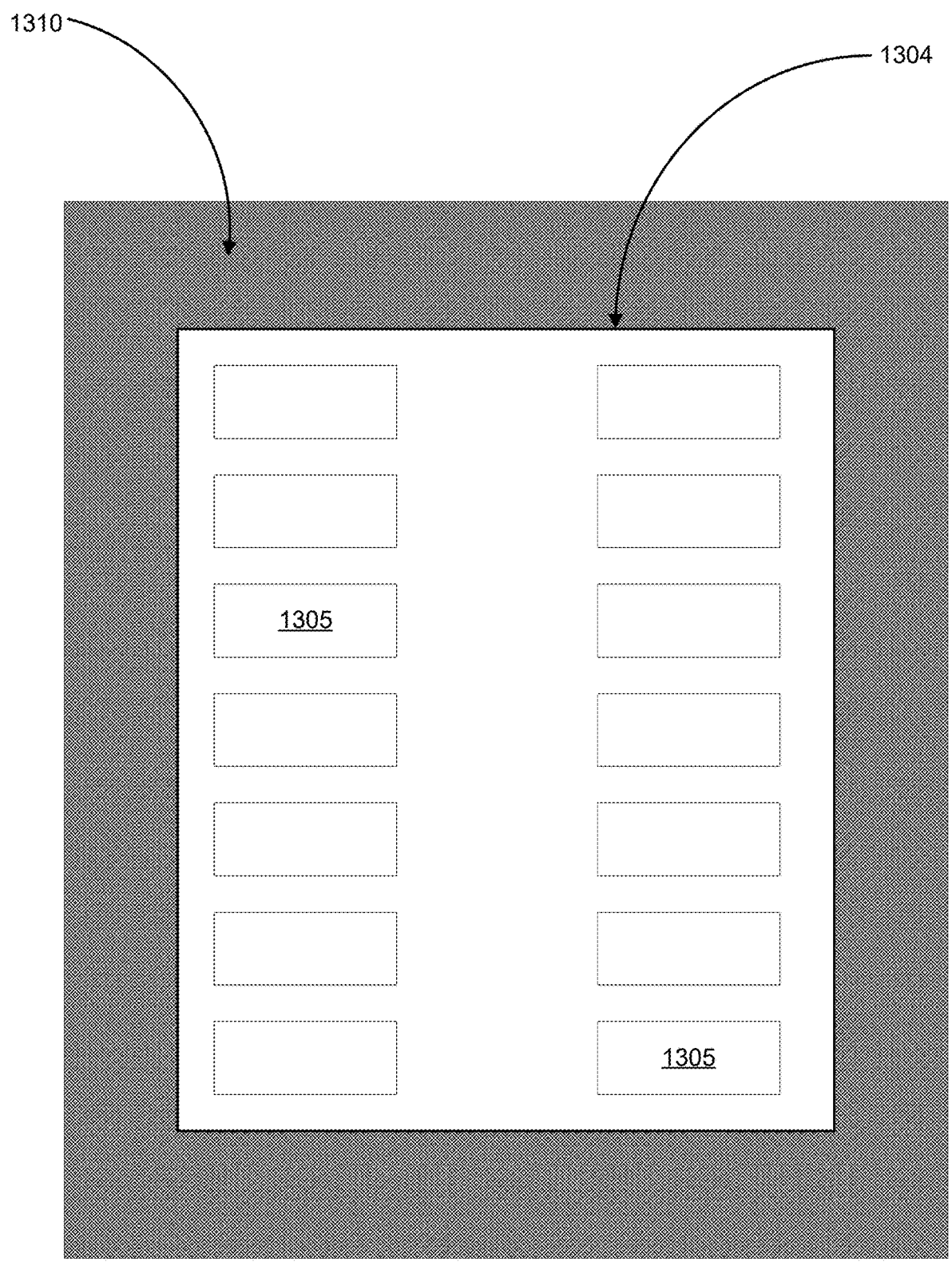
FIG. 13B shows a test arrangement in accordance with an embodiment.

FIGS. 13A and 13B shows a test arrangement 1300 in accordance with an embodiment.

The test arrangement 1300 comprises a pogo block frame 1301 which comprises a plurality of pogo blocks positions 1302, or pogo block locations. The pogo block frame may, for example, be mounted on a test head of an automated test equipment (wherein the channel modules are arranged within said test head). One or more pogo blocks 1303 are arranged in one or more of the pogo block positions 1302. It should be noted that test support modules, for example the test support modules according to any of the above described embodiments, for example, shown in FIGS. 3-9, are (mechanically) adapted to be inserted into one or more pogo block positions 1302 of the pogo block frame 1301.

The pogo pins of the test support modules are arranged to contact a load board 1304, when the load board 1304 is attached to the test arrangement. The pogo pins of the test support modules are, for example, arranged in a pattern which fits corresponding pads on the load board 1304.

The load board 1304 comprises a plurality of blocks 1305 of pogo pads in a peripheral area of the load board 1304, e.g., on a second side of the load board 1304 which is opposite to the first side of the load board 1304 (wherein e.g., a central area of the load board 1304 is free from pogo pads).

The load board may have different amount of blocks 1305 of pogo pads corresponding to pogo pin blocks. For example, two, or e.g., four, or e.g., eight groups of the blocks 1305 of pogo pads could be arranged symmetrically along at least one of the longitudinal peripheral areas of the load board 1304.

A support structure 1310 having the load board 1304 mounted on it is also shown in FIG. 17B. The support structure 1310 could be, for example, as one shown in FIG. 12.

However, it should be noted that the test arrangement 1300 may optionally be supplemented by any of the features, functionalities and details disclosed herein, both individually or taken in combination.

Figure 14:
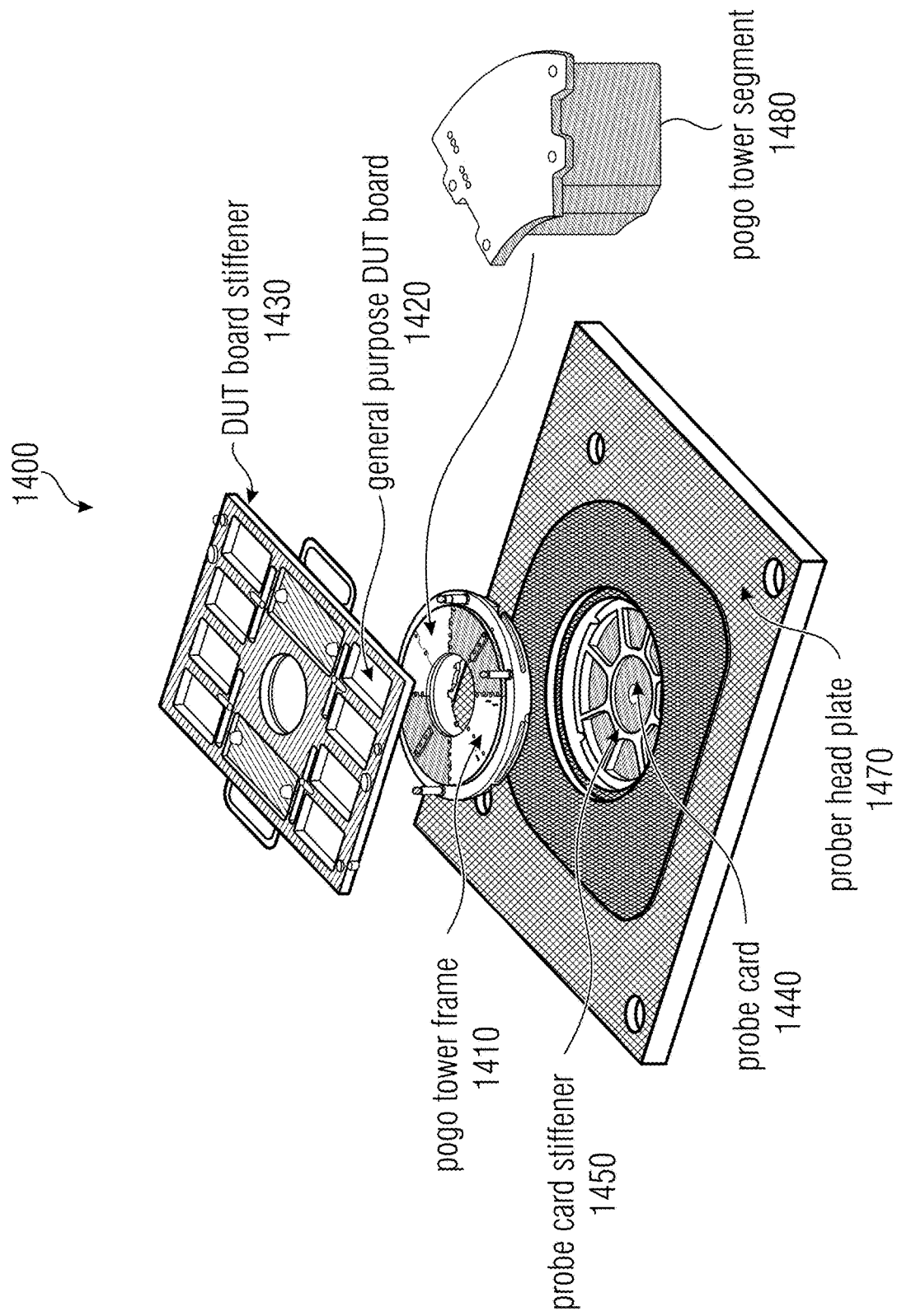
FIG. 14 shows a test arrangement in accordance with an embodiment.

FIG. 14 shows a test arrangement 1400 in accordance with an embodiment.

FIG. 14 shows a 3D view of a disassembled test arrangement 1400.

The test arrangement 1400 comprises a pogo block frame 1410, e.g., formed as a pogo tower, for establishing a connection between a load board 1420, e.g., a general purpose DUT Board, arranged, e.g., fixed, in a support structure 1430, e.g., a DUT Board Stiffener, and a probe card 1440. The probe card 1440 is arranged, e.g., fixed, in a probe card support structure 1450, e.g., Probe Card Stiffener, which is inserted in a Prober Head plate 1470.

The pogo block frame 1410 comprises a plurality of pogo block positions, e.g., formed as sectors of a circular ring, or as pogo tower segments. Through-connection pogo blocks for establishing a connection between opposite surfaces of the pogo block frame 1410 are arranged in one or more of the pogo block positions. Moreover, one or more test support modules are arranged in one or more of the pogo block positions.

The pogo block frame 1410 has a cylindrical form and comprises a cylindrical through cutout in a central part. The pogo block positions are arranged in a peripheral area of the pogo block frame 1410.

The pogo block frame 1410 comprises a plurality of pogo block positions 1480, e.g., formed as sectors of a circular ring, or as pogo tower segments. Through-connection pogo blocks for establishing a connection between opposite surfaces of the pogo block frame 1410 are arranged in one or more of the pogo block positions 1480. Moreover, one or more test support modules are arranged in one or more of the pogo block positions 1480.

The segment 1480 may, for example comprise the functionality of a test support module, having pogo pins on one side. However, the test support module may, in this case, have the same shape like a through connection pogo module.

Pogo pins at a first side of the one or more through-connection pogo blocks are arranged to contact the load board 1420, and pogo pins at a second side of the one or more through-connection pogo blocks are arranged to contact the probe card 1450.

However, it should be noted that the test arrangement 1400 may optionally be supplemented by any of the features, functionalities and details disclosed herein, both individually or taken in combination.

Figure 15:
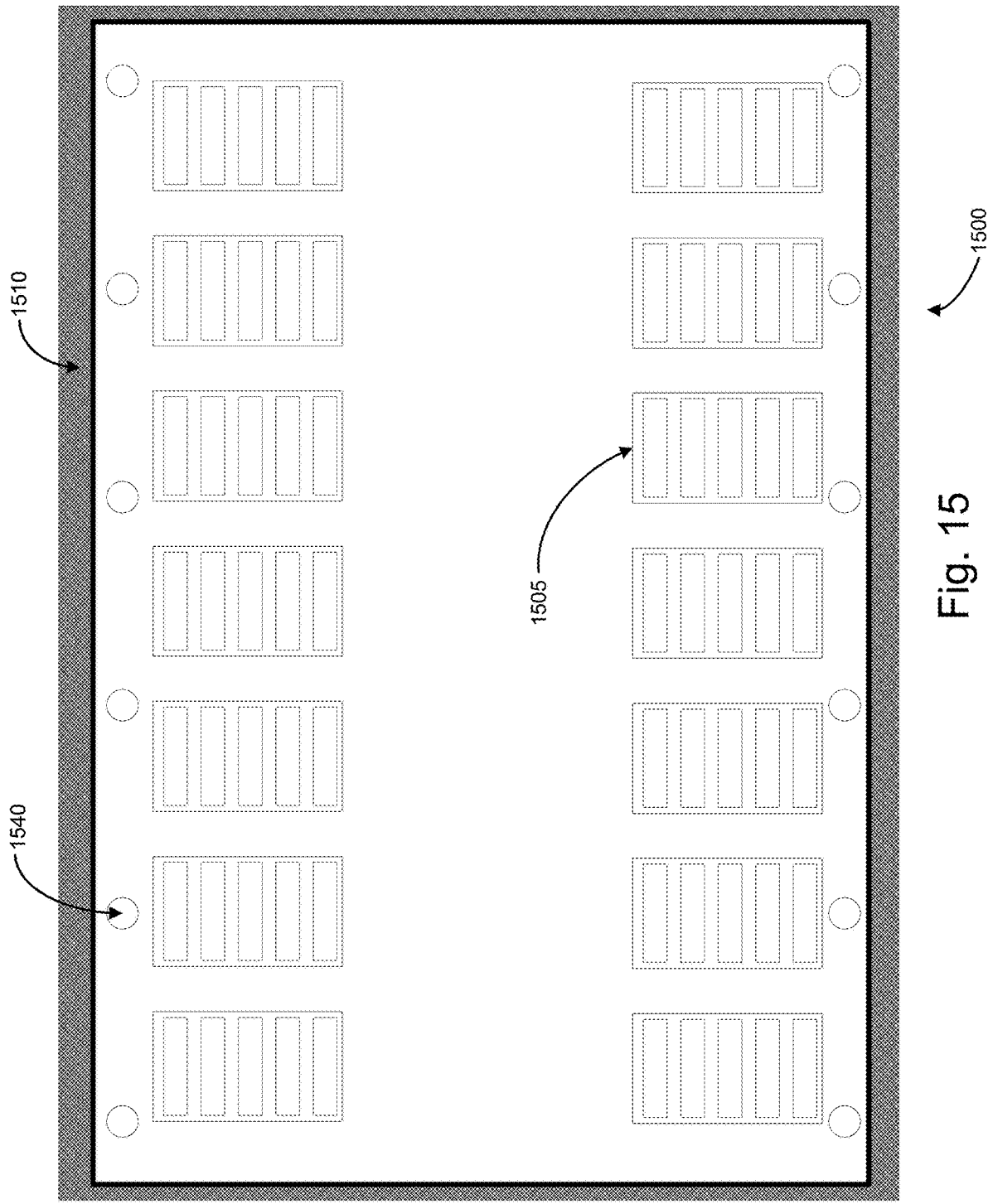
FIG. 15 shows a top view of a load board in accordance with an embodiment.

FIG. 15 shows a top view of a load board 1500 in accordance with an embodiment.

The load board 1500 is fixed in a support structure 1510. The support structure could be, for example, the same as shown in FIG. 12.

The load board 1500 comprises a plurality of blocks 1505 of pogo pads in a peripheral area of the load board (wherein e.g., a central area of the load board is free from pogo pads).

The support structure 1510 is implemented as a frame, for example as a metal frame. Pogo pins of one or more test support modules (not shown) are, for example, arranged in a pattern which fits corresponding pads on the load board 1510.

The support structure 1510 comprises fastening means 1540, e.g., screws, or alternative fastening means, used to removably attach the support structure 1510 with the load board 1500 mounted on it to the test arrangement.

The load board 1500 can be, for example, installed in a test arrangement as shown in FIGS. 10, 13, and 14.

However, it should be noted that the load board 1500 may optionally be supplemented by any of the features, functionalities and details disclosed herein, both individually or taken in combination.

Embodiments according to the disclosures may implement one or more of the following advantages. Embodiments according to the disclosures create a concept which allows application engineers to develop simple circuits in the field without relying on factory generated product, and/or saves load board space, and/or protects the electronic components from destruction due to high temperatures, and/or increases tester channel resources and signal performance. Embodiments according to the disclosures create a concept, which is more efficient in view of customization, and/or life duration of the components, and/or high signal performance and/or tester channel resources, and/or re-usability and/or the costs.

Although some aspects are described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The herein described embodiments are merely illustrative for the principles of the present disclosure. It is understood that modifications and variations of the arrangements and the details described herein will be apparent to others skilled in the art. It is the intent, therefore, to be limited by the scope of the Claims appended hereto and their equivalents and not by the specific details presented by way of description and explanation of the embodiments herein.

The foregoing descriptions of specific embodiments have been presented for purposes of illustration and description. They are not intended to be exhaustive or to limit the disclosure to the precise forms disclosed, and many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is intended that the scope of the disclosure be defined by the Claims appended hereto and their equivalents.

What is claimed is:

1. A test support module comprising:
   a plurality of pogo pins configured to establish a connection to at least one of a load board or a probe card of an automated test equipment;
   at least one electronic support component configured to support a test of at least one device under test (DUT),
   at least one of a multiplexer, a signal distributor, a signal conditioner, or a signal protocol converter;
   a signal path input, and
   a signal path output,
   wherein the at least one of the multiplexer, the signal distributor, the signal conditioner, or the signal protocol converter is in a signal path between the signal path input and the signal path output,
   wherein the at least one electronic support component is electrically coupled to the pogo pins;
   wherein the test support module is configured to be inserted into a pogo block frame of the automated test equipment to position the pogo pins in an alignment position to contact at least one of the load board or the probe card.

2. The test support module of claim 1, wherein the plurality of pogo pins electrically couple the test support module to an external environment.

3. The test support module of claim 1, wherein the test support module is configured to avoid a direct coupling to a channel module of the automated test equipment while coupling to the load board.

4. The test support module of claim 1, further comprising a load board side and a probe card side, wherein one of the load board side or the probe card side electrically connects the test support module to an external environment.

5. The test support module of claim 1, wherein the test support module is configured to couple to an automated test equipment channel comprising a plurality of device under test pins.

6. The test support module of claim 1, wherein the at least one electronic support component is configured to be in the signal path, and the signal path connects an automated test equipment channel and the at least one DUT.

7. The test support module of claim 1, wherein the signal path input is one of one or more signal path inputs and the signal path output is one of one or more signal path outputs, and wherein at least one of the one or more signal path inputs and a corresponding one of the one or more signal path outputs are coupled to a corresponding one of the pogo pins.

8. The test support module of claim 1, wherein at least one of the pogo pins is configured to receive one or more control signals to control a functionality of the at least one electronic support component.

9. The test support module of claim 1, further comprising a switch,
   wherein the switch is in the signal path between the signal path input and the signal path output.

10. The test support module of claim 1,
    wherein the signal distributor is configured to distribute a signal received from the signal path input to the signal path output.

11. The test support module of claim 1,
    wherein the signal conditioner is configured to manipulate a signal received from the signal path input.

12. The test support module of claim 1, wherein the signal protocol converter is configured to perform a signal protocol conversion.

13. The test support module of claim 1, wherein the test support module is configured to be inserted into at least one of a plurality of pogo block positions of the pogo block frame of the automated test equipment to position the pogo pins in the alignment position to contact at least one of the load board or the probe card.

14. The test support module of claim 1, further comprising at least one printed circuit board which is parallel to an axis of at least one of the pogo pins, and wherein the at least one electronic support component is positioned on the at least one printed circuit board.

15. The test support module of claim 14, further comprising a housing, wherein the housing comprises a side configured to face at least one of the load board or the probe card, wherein the side comprises a plurality of holes through which the pogo pins extend and a mounting structure for mounting in a pogo block position of the pogo block frame, and
    wherein the at least one printed circuit board is positioned within the housing.

16. A test arrangement for testing at least one device under test (DUT) comprising:
    a pogo block frame comprising a plurality of pogo block positions;
    at least one channel module;
    at least one pogo block comprising a plurality of pogo pins and a plurality of cables for establishing a connection with the at least one channel module, wherein the at least one pogo block is arranged in at least one of the pogo block positions;

at least one test support module is arranged in at least one of the pogo block positions, wherein the at least one test support module comprises a plurality of pogo pins; and a load board, wherein the load board comprises a plurality of pogo pads, wherein the pogo pins of the at least one pogo block contact the load board, wherein the pogo pins of the at least one test support module contact the load board, and wherein the pogo block frame, the at least one pogo block, and the at least one test support module are configured to enable the at least one pogo block and the at least one test support module to be interchangeably mountable in at least one of the pogo block positions.

17. The test arrangement of claim 16, further comprising a signal path which extends from the load board to the at least one test support module and from the at least one test support module to the load board.

18. The test arrangement of claim 16, further comprising a signal path which extends via the at least one test support module.

19. The test arrangement of claim 16, further comprising at least one of:
a signal path which extends from the at least one channel module to the at least one pogo block via one of the cables, from the at least one pogo block to a first pogo pad of the load board via a first pogo pin of the at least one pogo block, from the first pogo pad to a second pogo pad of the load board, from the second pogo pad to an input of the at least one test support module via a pogo pin of the at least one test support module, from an output of the at least one test support module to a third pogo pad of the load board via a pogo pin of the at least one test support module, and from the third pogo pad to a device under test, or
a signal path which extends from the device under test to a fourth pogo pad of the load board, from the fourth pogo pad to an input of the at least one test support module, from the output of the at least one test support module to a fifth pogo pad of the load board, from the fifth pogo pad to a sixth pogo pad of the load board, from the sixth pogo pad to the at least one pogo block via a pogo pin of the at least one pogo block, and from the at least one pogo block to the at least one channel module via one of the cables.

20. The test arrangement of claim 16, wherein the pogo block positions are arranged in a peripheral area of the pogo block frame.

21. The test arrangement of claim 16, wherein the pogo block frame comprises at least one row of openings, wherein the openings are configured for an installation of the at least one pogo block and the at least one test support module in at least one of the pogo block positions of the pogo block frame.

22. The test arrangement of claim 16, wherein the load board comprises a central area, a peripheral area, and at least one device under test socket in the central area, and wherein the pogo pads of the load board are positioned in the peripheral area.

23. The test arrangement of claim 22, wherein the at least one test support module is arranged to contact the pogo pads of the load board in the peripheral area of the load board.

24. The test arrangement of claim 16, wherein the load board comprises a first side and a second side which is opposite the first side,
wherein the at least one test support module is configured to contact the pogo pads on the first side of the load board, and
wherein the at least one device under test socket is positioned on the second side of the load board.

25. The test arrangement of claim 16, wherein the test arrangement is configured to be mounted on a test head of an automated test equipment.

26. The test arrangement of claim 25, wherein the test arrangement is configured to selectably couple an automated test equipment channel to at least one of a plurality of device under test pins or a support equipment, wherein the at least one test support module comprises at least one of a switch or a multiplexer configured to select to which one of the device under test pins the automated test equipment channel is to be coupled to, and wherein the at least one test support module is configured to process a signal provided by the at least one DUT to obtain a processed signal and to forward the processed signal to at least one of the automated test equipment channel or to the support equipment.

27. The test arrangement of claim 26, wherein the signal is a first signal, and the test arrangement is configured to distribute a second signal provided by the automated test equipment channel to at least one of a plurality of device under test pins, and wherein the at least one test support module comprises a distribution circuit operable to distribute the second signal.

* * * * *